United States Patent
Saito et al.

(10) Patent No.: US 7,349,973 B2
(45) Date of Patent: Mar. 25, 2008

(54) DATA TRANSFER CONTROL DEVICE, ELECTRONIC EQUIPMENT, AND DATA TRANSFER CONTROL METHOD

(75) Inventors: Nobuyuki Saito, Sapporo (JP); Hiroaki Shimono, Sapporo (JP); Takuya Ishida, Sapporo (JP); Yoshiyuki Kamihara, Sapporo (JP); Kenyou Nagao, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 952 days.

(21) Appl. No.: 10/377,632

(22) Filed: Mar. 4, 2003

(65) Prior Publication Data

US 2004/0073697 A1 Apr. 15, 2004

(30) Foreign Application Priority Data

Jun. 17, 2002 (JP) ............................. 2002-175775

(51) Int. Cl.
  *G06F 15/16* (2006.01)
(52) U.S. Cl. ...................................................... 709/229
(58) Field of Classification Search ................ 709/229, 709/225; 710/56, 306, 21–22; 358/1.14–1.16
  See application file for complete search history.

(56) References Cited

U.S. PATENT DOCUMENTS

| | | | |
|---|---|---|---|
| 6,266,715 B1 * | 7/2001 | Loyer et al. .................. 710/22 |
| 6,266,727 B1 * | 7/2001 | Smyers et al. ............... 710/105 |
| 6,393,493 B1 * | 5/2002 | Madden et al. ............. 719/321 |
| 6,690,676 B1 * | 2/2004 | Gulick ........................ 370/458 |
| 7,000,057 B1 * | 2/2006 | Novell et al. ................ 710/306 |
| 7,035,948 B1 * | 4/2006 | Liang et al. .................. 710/56 |
| 2002/0178310 A1 * | 11/2002 | Nozaki ........................ 710/240 |

FOREIGN PATENT DOCUMENTS

| JP | A 2001-119415 | 4/2001 |
|---|---|---|
| JP | B2-3636157 | 1/2005 |

OTHER PUBLICATIONS

Universal Serial Bus Specification, Revision 2.0, Apr. 27, 2000.*

(Continued)

*Primary Examiner*—William Vaughn, Jr.
*Assistant Examiner*—Greg Bengzon
(74) *Attorney, Agent, or Firm*—Oliff & Berridge, PLC

(57) ABSTRACT

A transaction is automatically issued with respect to one of end points and data is automatically transferred while the remaining data size of the transfer data is calculated based on the total size and the maximum packet size. When the remaining data size in the current transaction is less than the maximum packet size, the next transaction is issued automatically, and a short packet is transferred automatically to nest one of the end points. When the payload size of the packet to be transferred by the current transaction is the maximum packet size and the remaining data size of the transfer data is zero, a short packet of zero data length is transferred automatically to the next one of the end points. When DMA transfer is complete and the remaining data to be transferred is zero, a short packet of zero data length is transferred automatically in response to an IN token from a host. Data transfer according to USB On-The-Go is performed.

11 Claims, 23 Drawing Sheets

OTHER PUBLICATIONS

Interface, Jan. 2001, pp. 121-122 and 129 (with partial translation).
Universal Serial Bus Specification, Revision 1.1, Sep. 23, 1998, pp. 35-48 and 165-166.
Universal Serial Bus Specification, Revision 2.0, Apr. 27, 2000, pp. 37-56 and 277-228.

Joe Meza, "USB On—The-Go Software Requirements", SoftConnex Technologies, Inc., Jun. 12, 2002, pp. 1-21.
Nobuyuki Saito, "OTG Controller LSI Taking Reduction of CPU Load Into Consideration", Design Wave Magazine, Apr. 2002, pp. 82-88 (with abstract).

* cited by examiner

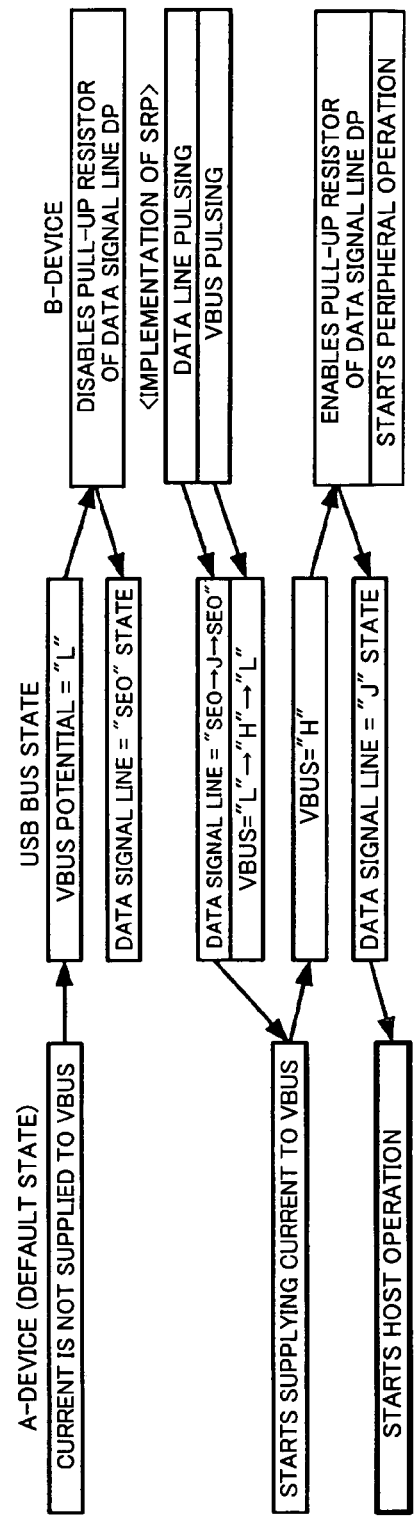
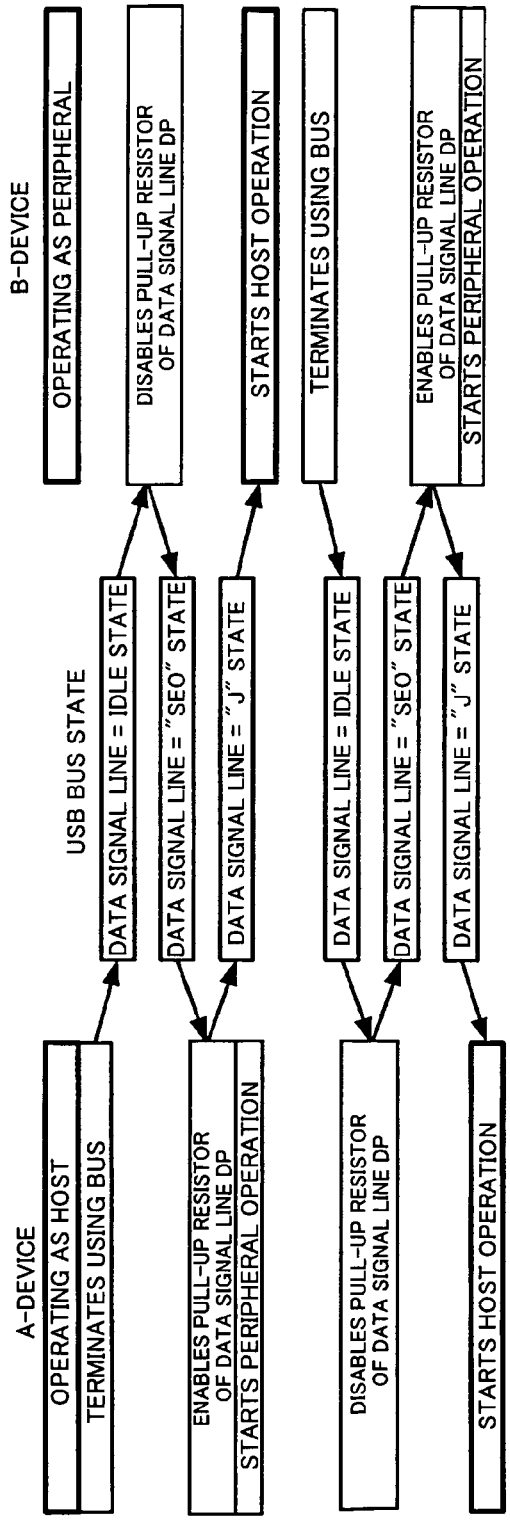
FIG. 2A  SRP (SESSION REQUEST PROTOCOL)
FIG. 2B  HNP (HOST NEGOTIATION PROTOCOL)

LIST STRUCTURE TYPE DESCRIPTOR

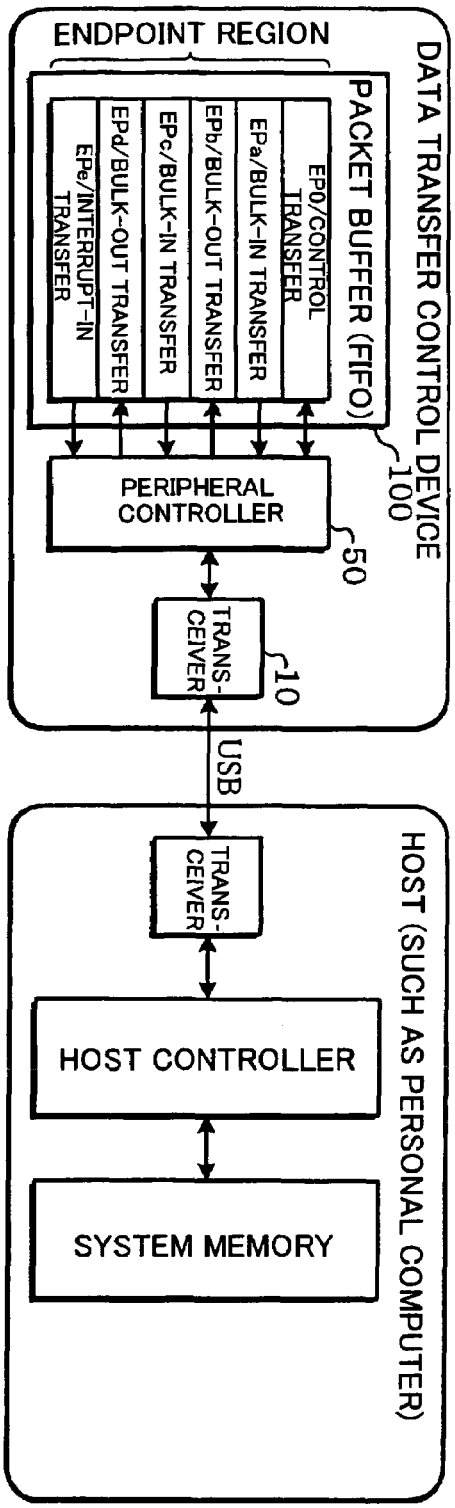
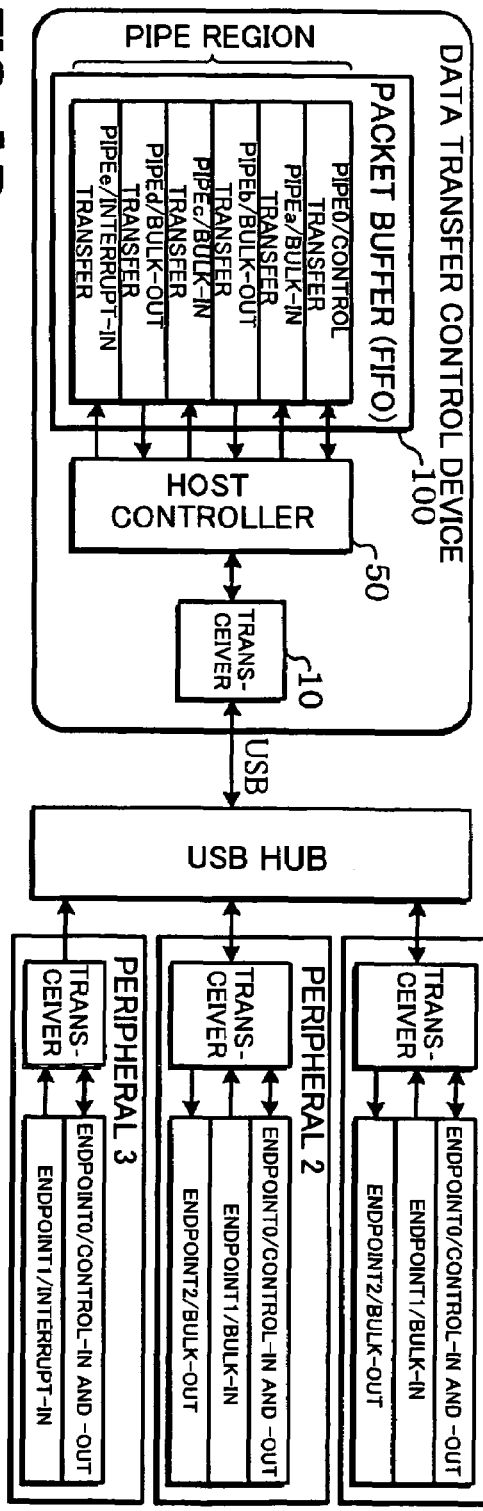

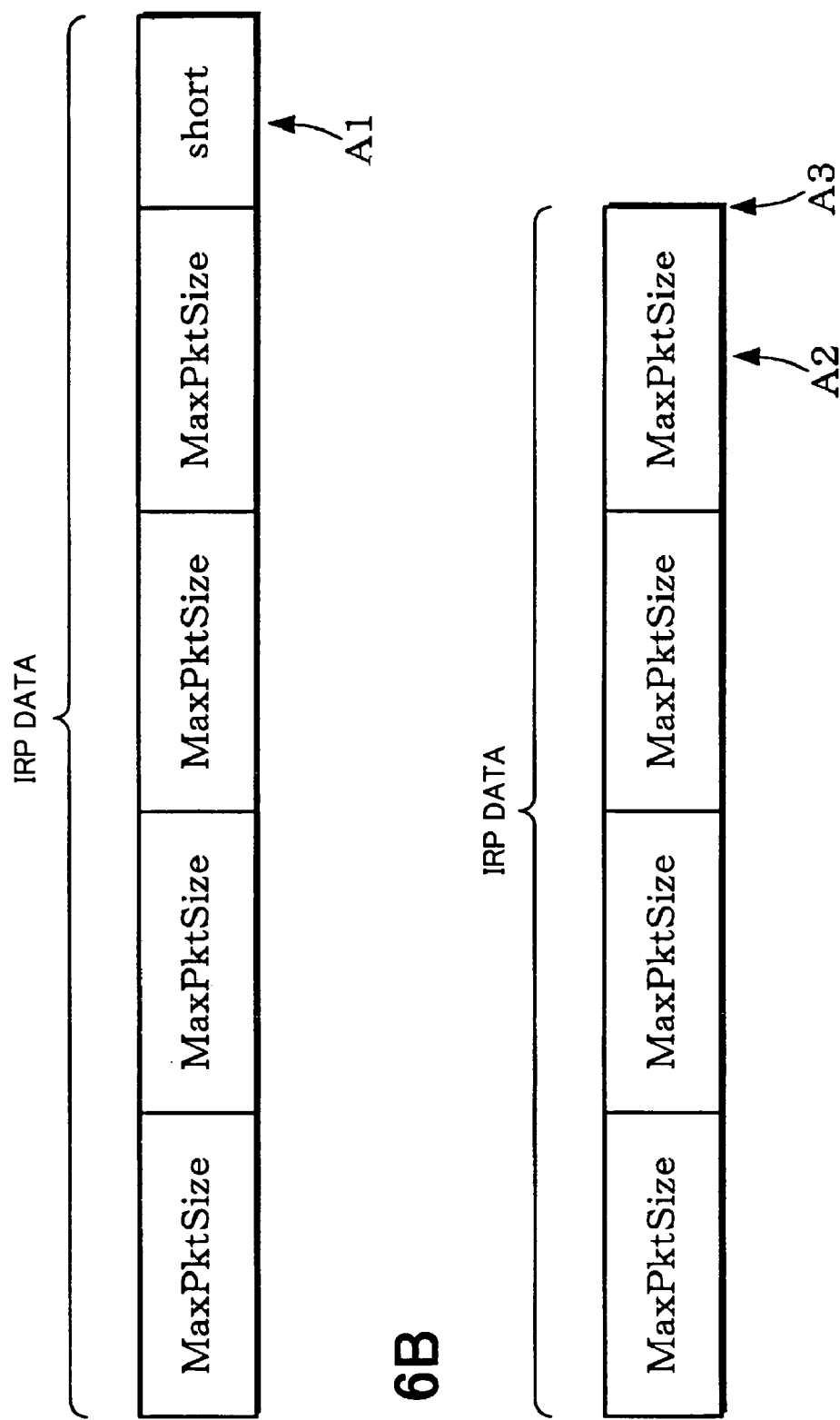

HOST OPERATION

PERIPHERAL OPERATION

FIG. 16

REGISTER SECTION

| | | | |
|---|---|---|---|
| TRANSFER CONDITION REGISTERS (PIPE/EP CONTROL REGISTERS) (0, a TO e) | HC/PC (PIPE/EP) COMMON REGISTERS | REGISTERS USED BOTH DURING HOST OPERATION (PIPE) AND PERIPHERAL OPERATION (EP) | DATA TRANSFER DIRECTION, TRANSFER TYPE, END POINT NUMBER, MAXIMUM PACKET SIZE, NUMBER OF PAGES, PRESENCE/ABSENCE OF DMA CONNECTION, ETC. |
| | HC (PIPE) REGISTERS | REGISTERS USED ONLY DURING HOST OPERATION (PIPE) | INTERRUPT TRANSFER TOKEN ISSUE PERIOD, NUMBER OF TRANSACTION CONTINUOUS EXECUTIONS, FUNCTION ADDRESS, TOTAL SIZE OF TRANSFER DATA, AUTOMATIC TRANSACTION START INSTRUCTION, AUTOMATIC CONTROL TRANSFER MODE INSTRUCTION, ETC. |
| | PC (EP) REGISTERS | REGISTERS USED ONLY DURING PERIPHERAL OPERATION (EP) | END POINT ENABLE, HANDSHAKE SPECIFICATION, ETC. |
| | COMMON ACCESS CONTROL REGISTERS FOR PACKET BUFFER (FIFO) | REGISTERS ENABLING ACCESS CONTROL FOR PACKET BUFFER (FIFO) | BUFFER I/O PORT, BUFFER FULL/EMPTY, BUFFER REMAINING DATA SIZE, ETC. |
| INTERRUPT-RELATED REGISTERS | INTERRUPT STATUS REGISTER | REGISTER THAT INDICATES INTERRUPT STATUS (CAUSE) | OTGC-RELATED, HC (PIPE)-RELATED, PC (EP)-RELATED, ETC. |
| | INTERRUPT ENABLE REGISTER | REGISTER THAT SETS INTERRUPT ENABLE/DISABLE STATE | OTGC-RELATED, HC (PIPE)-RELATED, PC (EP)-RELATED, ETC. |
| | INTER-BLOCK COMMON REGISTER | REGISTER USED IN COMMON BETWEEN BLOCKS | BLOCK RESET INSTRUCTION, ETC. |
| BLOCK-RELATED REGISTERS | BLOCK REGISTERS | REGISTERS USED WITHIN THE Xcvr, OTGC, HC, AND PC BLOCKS | Xcvr CONTROL, OTGC STATE COMMAND, HC STATE COMMAND, FRAME NUMBER, ETC. |
| DMA CONTROL REGISTER | — | REGISTER FOR SETTINGS RELATING TO DMA CONTROL | DMA TRANSFER START INSTRUCTION, TOTAL SIZE OF DMA TRANSFER DATA, ETC. |

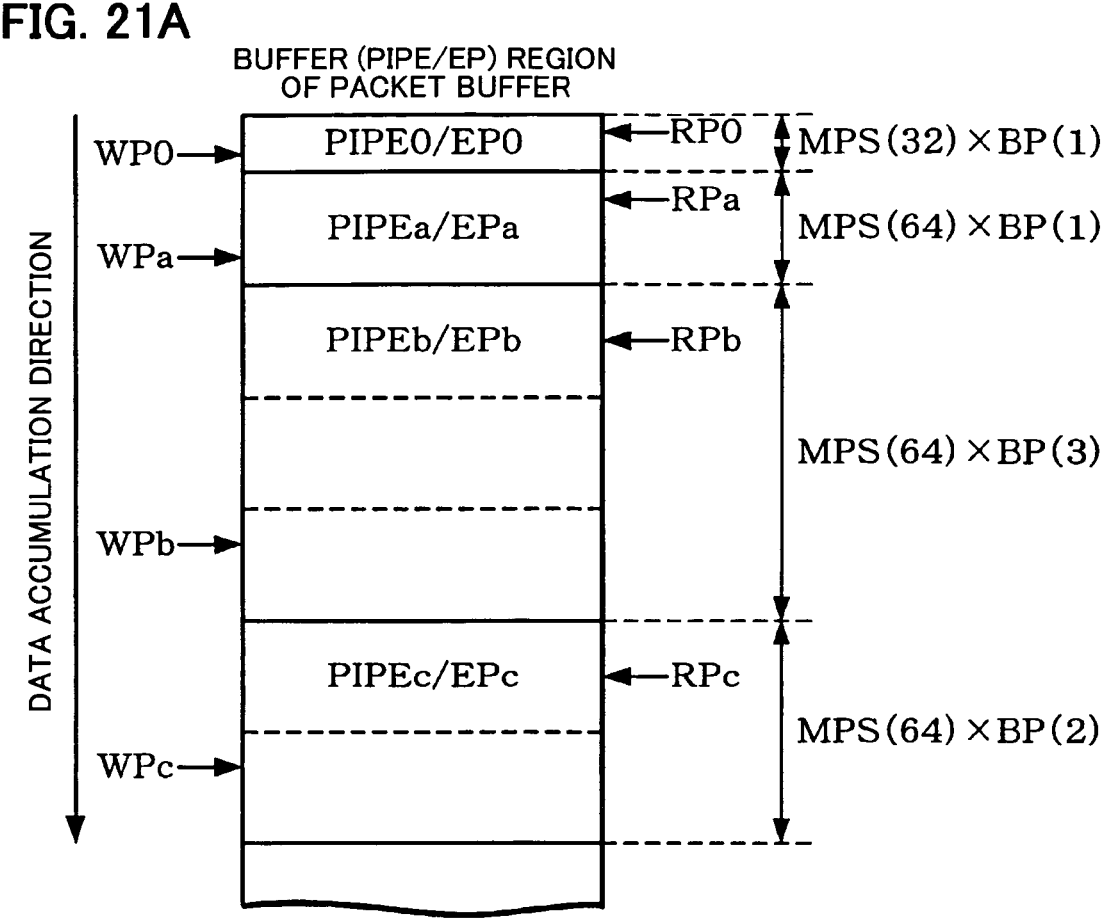

DATA TRANSFER CONTROL DEVICE, ELECTRONIC EQUIPMENT, AND DATA TRANSFER CONTROL METHOD

Japanese Patent Application No. 2002-175775, filed on Jun. 17, 2002, is hereby incorporated by reference in its entirety.

BACKGROUND

The present invention relates to a data transfer control device, electronic equipment, and a data transfer control method.

The universal serial bus (USB) standard 2.0 is expanding well in the marketplace, but an interface standard called the USB On-The-Go (OTG) has been settled upon by the USB Implementers Forum (USB-IF). The OTG standard (OTG 1.0) that has been derived as an extension of USB 2.0 holds out the possibility of bringing out new additional value to the USB interface, and it is expected that applications that make use of these characteristics will appear.

This OTG makes it possible to impart a host function to a peripheral (peripheral device) connected to a host (such as a personal computer) by existing USB. This makes it possible to transfer data between peripherals connected by USB, enabling direct connection between a digital camera and a printer, by way of example, so that an image from the digital camera can be printed. It is also possible to connect a digital camera or digital video camera to a storage device, to save data therein.

However, it is usual for a peripheral that is given the host function by OTG to have a limited-capability CPU (processing section) incorporated therein. The addition of the host function therefore places a heavy processing load on the CPU (firmware) of the peripheral, making processing complicated and raising further problems such as impeding other processes and increasing the design period of the device.

In particular, if the firmware (processing section) determines whether or not the packet transferred by the final transaction is a short packet, the processing load on the firmware will increase, making it difficult to transfer a series of packets automatically.

It has been determined that there are some devices that cannot recognize the final end of transfer data if the packet that is transferred in the final transaction is a packet of the maximum packet size.

SUMMARY

According to one aspect of the present invention, there is provided a data transfer control device for data transfer over a bus, the data transfer control device comprising:

a buffer controller which controls access to a packet buffer in which is stored transfer data;

a register section including registers in which are set the total size of transfer data and the maximum packet size; and a transfer controller which automatically issues a transaction with respect to one of end points, and automatically transfers data to the end point while calculating the remaining size of data to be transferred, based on the total size of data and the maximum packet size, wherein the transfer controller automatically issues the next transaction and automatically transfers a short packet to the end point, when the remaining data size of transfer data in the current transaction is less than the maximum packet size.

According to another aspect of the present invention, there is provided a data transfer control device for data transfer over a bus, the data transfer control device comprising:

a buffer controller which controls access to a packet buffer in which is stored transfer data;

an interface circuit which performs direct memory access (DMA) transfer between another bus that differs from the bus and the packet buffer; and a transfer controller which automatically transfers data to a host, when an IN token has been received from the host, wherein the transfer controller automatically transfers a short packet of zero data length to the host in response to the IN token from the host, when DMA transfer between the other bus and the packet buffer is complete and also the amount of data remaining to be transferred is zero.

BRIEF DESCRIPTION OF THE SEVERAL VIEWS OF THE DRAWING

FIGS. 2A and 2B are illustrative of the SRP and HNP protocols.

FIGS. 5A and 5B are illustrative of pipe regions and end point region.

FIGS. 6A and 6B are illustrative of cases in which the IRP data transfer is completed by a short packet and by a packet of the maximum packet size.

FIG. 16 is illustrative of the register section.

FIGS. 21A, 21B, and 21C are illustrative of the region allocation method and the pointer assignment method.

DETAILED DESCRIPTION OF THE EMBODIMENT

Figure 1A:
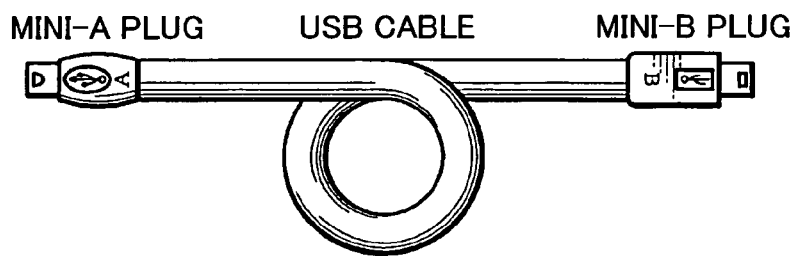
FIGS. 1A, 1B, and 1C are illustrative of the USB OTG standard.

Embodiments of the present invention are described below.

Note that the embodiments described below do not in any way limit the scope of the present invention as laid out in the claims herein. In addition, all elements of the embodiments described below should not be taken as essential requirements of the present invention.

According to one embodiment of the present invention, there is provided a data transfer control device for data transfer over a bus, the data transfer control device comprising:

a buffer controller which controls access to a packet buffer in which is stored transfer data;

a register section including registers in which are set the total size of transfer data and the maximum packet size; and a transfer controller which automatically issues a transaction with respect to one of endpoints, and automatically transfers data to the end point while calculating the remaining size of data to be transferred, based on the total size of data and the maximum packet size, wherein the transfer controller automatically issues the next transaction and automatically transfers a short packet to the end point, when the remaining data size of transfer data in the current transaction is less than the maximum packet size.

With this embodiment of the invention, data (a series of packets) is automatically transferred to one of the end points while the remaining data size of the transfer data is calculated. If the remaining data size of the transfer data becomes less than the maximum packet size, the next transaction is issued automatically and a short packet is transferred automatically to the end point. This enables a series of packets to be used to automatically transfer the transfer data to one of the end points, without the processing section determining whether or not the final packet is a short packet. This enables advantages such as a reduction in processing load on the processing section.

With this embodiment, the transfer controller may automatically issue the next transaction and automatically transfer a short packet of zero data length to the end point, when the payload size of a packet to be transferred by the current transaction is the maximum packet size, and also the remaining data size of the transfer data is zero.

If a peripheral to which data is transferred is unable to recognize the final end of the transfer data, the peripheral can recognize it by transferring a zero-length short packet.

With this embodiment of the invention, a plurality of pipe regions for storing data to be transferred to or from the end points may be allocated in the packet buffer;

the register section may include a plurality of transfer condition registers in each of which transfer condition information for data transfer between each of the pipe regions and corresponding one of the end points is set;

the total size and the maximum packet size may be set in the transfer condition registers as the transfer condition information; and the transfer controller automatically may issue a transaction with respect to one of the end points, based on the transfer condition information in the transfer condition registers, and automatically transfer data between each of the pipe regions and corresponding one of the end points.

With this embodiment, a plurality of pipe regions (buffer regions) is allocated with respect to the packet buffer. In such a case, each pipe region is allocated to correspond to one of the end points of the bus. In each pipe region is stored (buffered) data to be transferred (transmitted or received) to or from corresponding one of the end points. The buffer controller performs access control (region management) of the packet buffer (buffer) in which these pipe regions are allocated.

With this embodiment, transfer condition information (end point information, pipe information) for data transfer between each of the pipe regions and corresponding one of the end points is set in each transfer condition register (pipe register). The transfer controller automatically issues this transaction with respect to one of the end points, based on transfer condition information that has been set in the transfer condition registers, and automatically transfers data between each of the pipe regions and corresponding one of the end points. This makes it possible to reduce the processing load on the processing section.

With this embodiment, the transfer controller may perform processing to determine whether or not to transfer a short packet, based on the remaining data size of transfer data in each of the pipe regions.

This makes it possible to perform appropriate short packet transfer processing for each of the pipe regions.

The data transfer control device in this embodiment may further comprise a state controller which controls a plurality of states including a host-operation state, in which the data transfer control device operates as a role of a host, and a peripheral-operation state, in which the data transfer control device operates as a role of a peripheral, wherein:

the transfer controller may include a host controller which performs data transfer as a host during host operation, and a peripheral controller which performs data transfer as a peripheral during peripheral operation;

during host operation, a plurality of pipe regions for storing data to be transferred to or from the end points may be allocated in the packet buffer, and the host controller may transfer data between each of the pipe regions and corresponding one of the end points;

during peripheral operation, a plurality of end point regions for storing data to be transferred to or from a host may be allocated in the packet buffer, and the peripheral controller may transfer data between each of the endpoint regions and the host; and the host controller may automatically transfer a short packet to one of the end points corresponding to each of the pipe regions, during host operation.

This embodiment ensures that if a state controlled by the state controller becomes a host-operation state, by way of example, data transfer is performed by the host controller in the role of host. Similarly, if the state controlled by the state controller becomes a peripheral-operation state, data transfer is performed by the peripheral controller in the role of peripheral. This makes it possible to implement the dual-role device function. With this embodiment, not only can this dual-role device function be implemented, but also the processing load on the processing section can be reduced during host operation.

The data transfer control device of this embodiment may further comprise an interface circuit which performs data transfer between another bus that differs from the bus and the packet buffer, wherein:

when a processing section has instructed the interface circuit and the transfer controller to start data transfer, the interface circuit may perform data transfer through the other bus and also the transfer controller may perform data transfer through the bus; and when the data transfer has ended, the transfer controller may generate an interrupt with respect to the processing section.

This ensures that the processing section does not need to exercise control over the data transfer control device after the instruction to start the data transfer through the bus and the other bus (such as processing section bus or system memory bus), up until an interrupt is generated. This reduces the processing load on the processing section.

According to one embodiment of the present invention, there is provided a data transfer control device for data transfer over a bus, the data transfer control device comprising:

a buffer controller which controls access to a packet buffer in which is stored transfer data;

an interface circuit which performs direct memory access (DMA) transfer between another bus that differs from the bus and the packet buffer; and a transfer controller which automatically transfers data to a host, when an IN token has been received from the host, wherein the transfer controller automatically transfers a short packet of zero data length to the host in response to the IN token from the host, when DMA transfer between the other bus and the packet buffer is complete and also the amount of data remaining to be transferred is zero.

With this embodiment, if DMA transfer is complete and also the amount of data remaining to be transferred is zero, the next transaction is issued automatically and a short packet of zero data length is automatically transferred to the host.

If the host to which data is transferred is unable to recognize that final end of the transfer data, the host can recognize it by the transfer of a zero-length short packet.

The data transfer control device of this embodiment may further comprise a state controller which controls a plurality of states including a host-operation state, in which the data transfer control device operates as a role of a host, and a peripheral-operation state, in which the data transfer control device operates as a role of a peripheral, wherein:

the transfer controller may include a host controller which performs data transfer as a host during host operation, and a peripheral controller which performs data transfer as a peripheral during peripheral operation;

during host operation, a plurality of pipe regions for storing data to be transferred to or from end points may be allocated in the packet buffer, and the host controller may transfer data between each of the pipe regions and corresponding one of the end points;

during peripheral operation, a plurality of end point regions for storing data to be transferred to or from a host may be allocated in the packet buffer, and the peripheral controller may transfer data between each of the endpoint regions and the host; and the peripheral controller may automatically transfer a short packet of zero data length to a host, during peripheral operation.

With this embodiment, the transfer controller may determine whether or not to transfer a short packet of zero data length, based on the remaining data size of transfer data in each of the end-point regions.

With this embodiment, data transfer conforming to the universal serial bus (USB) on-the-go (OTG) standard may be performed.

According to one embodiment of the present invention, there is provided electronic equipment comprising:

any one of the above-described data transfer control devices;

a device which performs output processing, fetch processing, or storage processing on data to be transferred through the data transfer control device and the bus; and a processing section which controls data transfer of the data transfer control device.

According to one embodiment of the present invention, there is provided a data transfer control method for data transfer through a bus, the method comprising:

performing access control for a packet buffer in which transfer data is stored;

setting the total size of transfer data and the maximum packet size in registers in a register section;

automatically issuing a transaction with respect to one of end points and automatically transferring data to the end point while calculating the remaining size of data to be transferred, based on the total size of data and the maximum packet size; and automatically issuing the next transaction and automatically transferring a short packet to the endpoint, when the remaining size of transfer data in the current transaction is less than the maximum packet size.

According to one embodiment of the present invention, there is provided a data transfer control method for data transfer through a bus, the method comprising:

controlling access to a packet buffer in which transfer data is stored;

performing direct memory access (DMA) transfer between another bus that differs from the bus and the packet buffer;

automatically transferring data to a host, when an IN token has been received from the host; and automatically transferring a short packet of zero data length to the host in response to an IN token from the host, when DMA transfer between the other bus and the packet buffer is complete and also the amount of data remaining to be transferred is zero.

These embodiments will be described below with reference to the accompanying figures.

1. OTG

The USB on-the-go (OTG) function will first be briefly described.

1.1 A Device and B Device

With OTG, the Mini-A plug and Mini-B plug are defined as standard connectors, as shown in FIG. 1A. Mini-AB receptacles are defined as connectors that enable connection for both of these Mini-A and Mini-B plugs (generally speaking: first and second plugs of a cable).

Figure 1B:
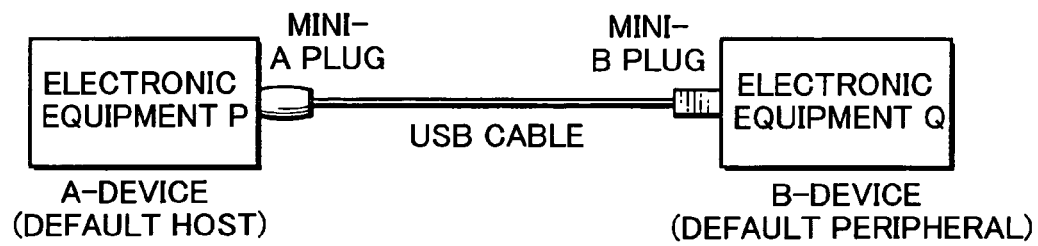
Figure 1C:
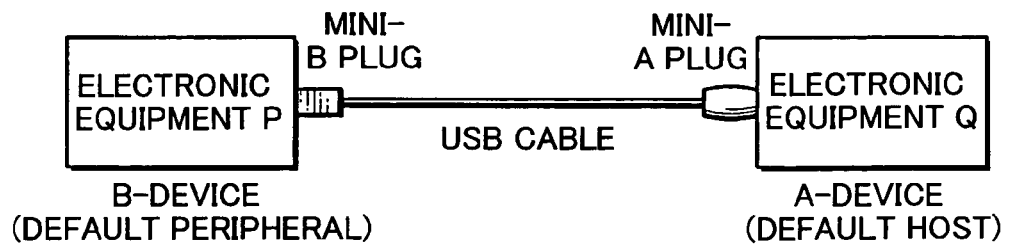

If the Mini-A plug of a USB cable is connected to electronic equipment P and the Mini-B plug is connected to electronic equipment Q, as shown in FIG. 1B by way of example, the electronic equipment P is set to be the A-device and the electronic equipment Q is set to be the B-device. If the Mini-B plug and Mini-A plug are connected to electronic equipment P and Q as shown in FIG. 1C, on the other hand, electronic equipment P and Q are set to be the B-device and the A-device, respectively.

An ID pin in the Mini-A plug is connected to ground and an ID pin in the Mini-B plug is in a floating state. Each piece of electronic equipment can determined whether a Mini-A plug or a Mini-B plug is connected to it, by using a built-in pull-up resistor circuit to detect the voltage level of that ID pin.

With OTG, the A-device (master) becomes the side (supply source) that supplies power (VBUS) and the B-device (slave) becomes the side that receives power (supply destination). The default state of the A-device is host and the default state of the B-device is peripheral.

1.2 Dual-Role Device

OTG enables the definition of a dual-role device that can perform both the role of a host (simple host) and the role of a peripheral.

A dual-role device can be either a host or a peripheral. The partner connected to the dual-role device determines the role of the dual-role device uniquely, depending on whether it is a host or peripheral under the prior-art USB standard. In other words, if the connected partner is a host, the dual-role device becomes a peripheral, whereas if the connected partner is a peripheral, the dual-role device becomes a host.

If the connected partner is also a dual-role device, on the other hand, the two dual-role devices can negotiate the roles of host and peripheral between themselves.

1.3 SRP and HNP

A dual-role device has session request protocol (SRP) and host negotiation protocol (HNP) functions, as shown in FIGS. 2A and 2B.

In this case, SRP is a protocol by which the B-device requests the supply of VBUS (power) from the A-device.

With OTG if no bus is used, the a device can halt the supply of VBUS. This makes it possible to prevent wasteful power consumption when the A-device is a small portable device, by way of example. If the B-device requires the supply of VBUS after the A-device has stopped the supply of VBUS, this SRP can be used to request the restart of the VBUS supply from the A-device.

The SRP flow is shown in FIG. 2A. As shown in FIG. 2A, the B-device requests the VBUS supply from the A-device by performing data line pulsing and VBUS pulsing. If the B-device operates as a peripheral after the supply of VBUS by the A-device has started, the A-device starts host operation.

As described with reference to FIGS. 1A to 1C, if dual-role devices are connected, the A-device that is the side connected to the Mini-A plug becomes the default host and the B-device that is the side connected to the Mini-B plug becomes the default peripheral. With OTG, the host and peripheral roles can be switched without removing the plugs. HNP is a protocol for this switching of the host and peripheral roles.

The HNP flow is shown in FIG. 2B. If the A-device, which is operating as host by default, stops using the bus, the bus goes into an idle state. When the B-device subsequently disables a pull-up resistor of a data signal line DP (D+), the A-device enables the pull-up resistor of DP. This changes the role of the A-device from host to peripheral, and starts the operation thereof as a peripheral. The role of the B-device changes from peripheral to host, and starts the operation thereof as a host.

If the B-device subsequently stops using the bus and the A-device disables the pull-up resistor of DP, the B-device enables the pull-up resistor of DP. This returns the role of the B-device from host to peripheral, restarting the operation thereof as peripheral. The role of the A-device returns from peripheral to host, and starts the operation thereof as host.

The above-described OTG makes it possible for portable devices such as mobile phones and digital cameras to operate as USB hosts, enabling data transfer between portable devices connected in a peer-to-peer fashion. This makes it possible to add more value to the USB interface, enabling the production of applications that could not exist up before.

2. OHCI

With conventional USB, a data transfer control device (host controller) of a personal computer that acts as host conforms to a standard such as the open host controller interface (OHCI) or universal host controller interface (UHCI) proposed by Microsoft. The operating systems (OSs) that is used therefore are limited to OSs such as Windows (registered tradename) produced by Microsoft and the Macintosh OSs produced by Apple.

However, there is an infinite variety of incorporated CPUs and architectures in the small portable devices that are target applications of OTG, as well as the OSs used therein. In addition, the versions of OHCI or UHCI that have been standardized towards the host controllers of personal computers have the prerequisite that they will be installed to function completely as USB hosts, so it is difficult to optimize installation in small portable devices.

Figure 3A:
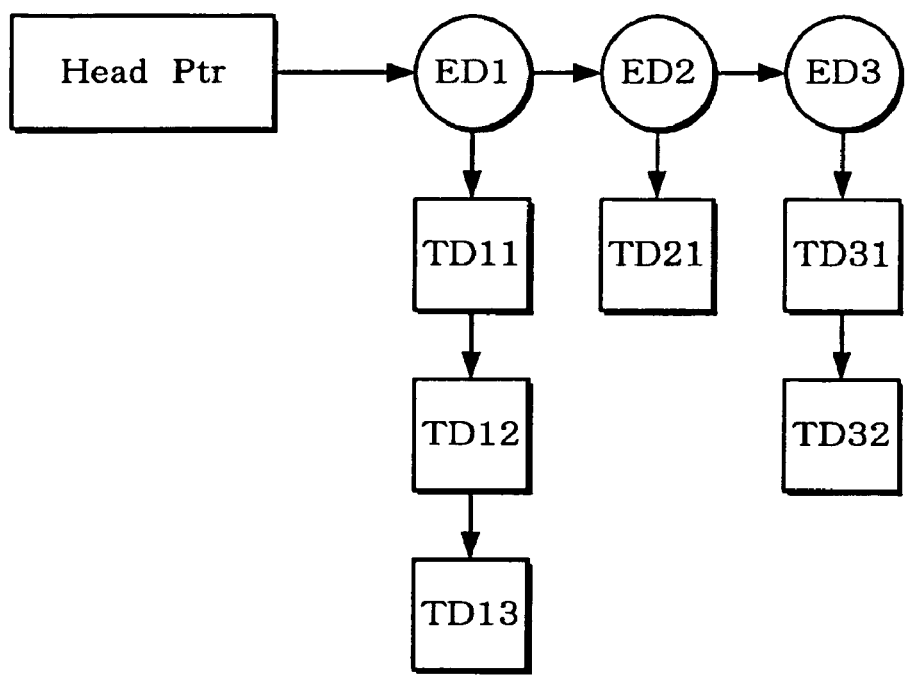
FIGS. 3A and 3B are illustrative of the OHCI list structure type descriptor.

An example of the list structure type descriptor used by OHCI is shown in FIG. 3A.

In FIG. 3A, end point descriptors ED1, ED2, and ED3 are linked by link pointers and comprise information that is necessary for communication between end points 1, 2, and 3. Transfer descriptors TD11 to TD13, TD21, and TD31 to TD32 are linked to ED1, ED2, and ED3 by further link pointers. Information that is necessary for packet data transferred between the end points 1, 2, and 3 is comprised within these transfer descriptors.

Figure 3B:
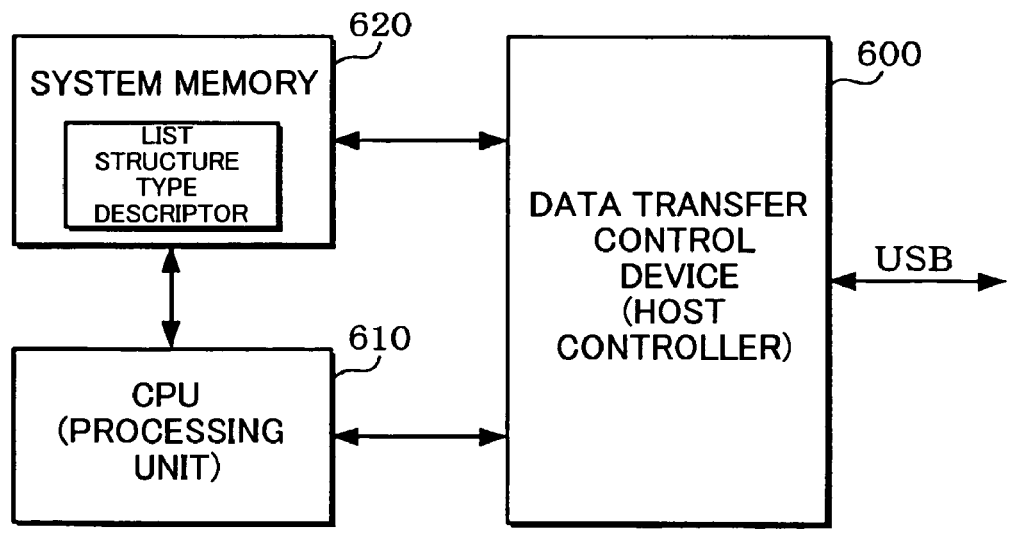

The list structure type descriptor of FIG. 3A is created by firmware (host controller/driver) operating on a CPU 610 (generally speaking: a processing section) shown in FIG. 3B, and is written to system memory 620. In other words, the firmware allocates end point descriptors to end points within the system, and creates end point descriptors and transfer descriptors based on end point information. These descriptors are linked by link pointers and are written to the system memory 620.

A data transfer control device 600 (host controller) reads the list structure type descriptor that was written to the system memory 620, and performs data transfer based on the information written in the end point descriptors and transfer descriptors.

Specifically, the data transfer control device 600 (host controller) bases the setting of information for end point 1 on ED1, and transfers data to and from end point 1 based on TD11 that is linked to ED1. Next, it bases the setting of information for end point 2 on ED2, and transfers data to and from end point 2 based on TD21 that is linked to ED2. Similarly, the data transfer control device 600 performs data transfer based on TD31, TD12, TD32, and TD13.

In the manner described above, the firmware (host controller/driver) operating in the CPU of a data transfer control device (host controller) conforming to OHCI has to create descriptors of the complicated structure shown in FIG. 3A. The processing load on the CPU is therefore high.

In such a case, the only device that can be allocated the role of host under the prior-art USB is a personal computer, and that personal computer has to have a high-performance CPU. It is therefore possible to have spare capacity therein, even during the creation of descriptors of the complicated structure shown in FIG. 3A.

However, the CPU (embedded CPU) incorporated into a small portable device (such as a digital camera or mobile phone) which is the target application for OTG generally has a much lower level of capabilities than the CPU of a personal computer. If a portable device is to operate as an OTG host, therefore, a large load is placed on the CPU incorporated in the portable device, which impedes other processes and causes problems such as a deterioration in performance.

3. Configurational Example

Figure 4:
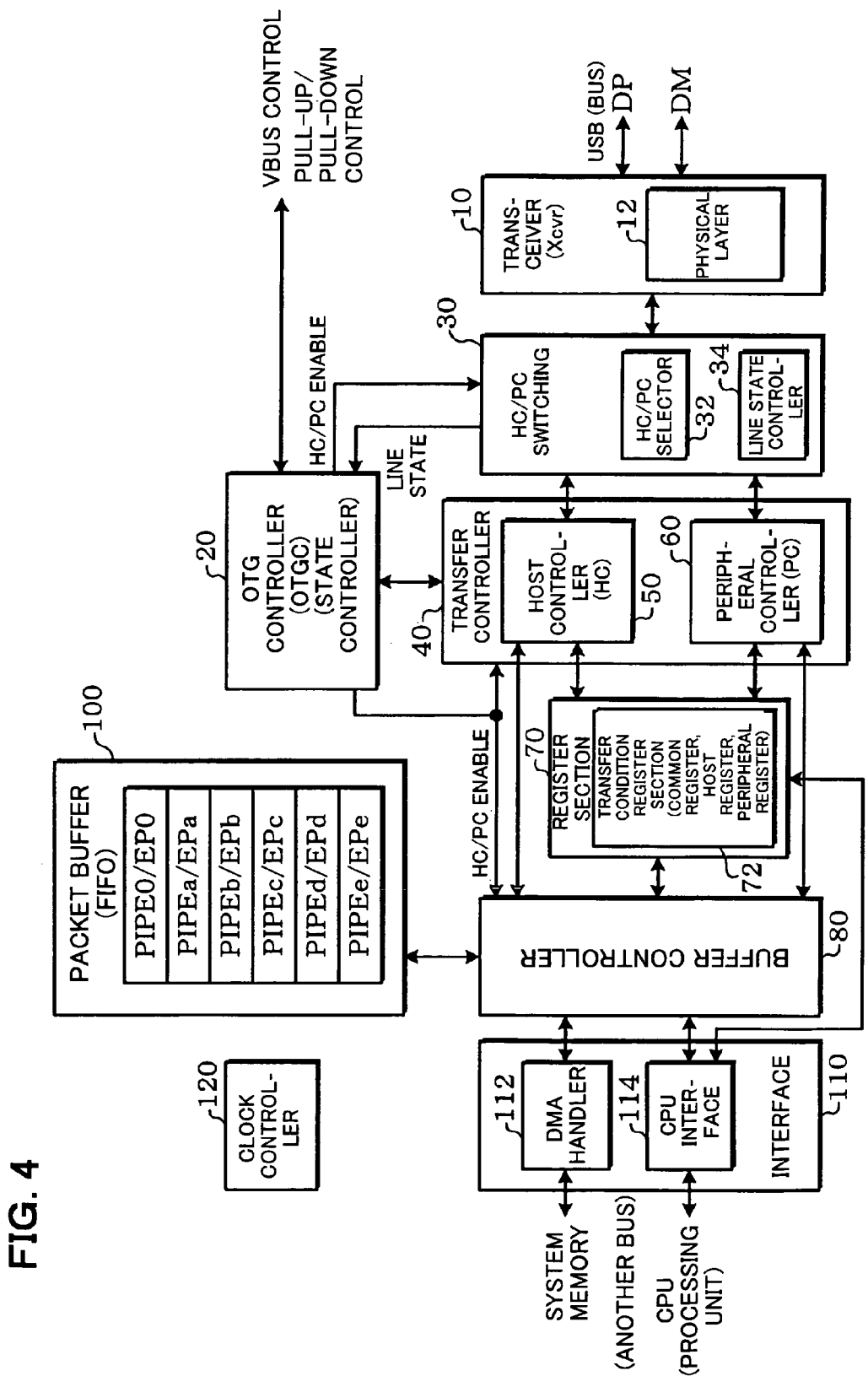
FIG. 4 shows an example of the configuration of a data transfer control device in accordance with one embodiment of the present invention.

An example of the configuration of a data transfer control device in accordance with this embodiment that can solve the above problem is shown in FIG. 4. Note that the data transfer control device of this embodiment need not necessarily have all the circuit blocks shown in FIG. 4; some of those circuit blocks can be omitted.

A transceiver 10 (hereinafter called a Xcvr as appropriate) is a circuit for transmitting and receiving USB (generally speaking: a bus) data, using differential data signals DP and DM, and it comprises a USB physical-layer (PHY) circuit 12. More specifically, the transceiver 10 creates line states (such as J, K, and SE0) for DP and DM, and performs serial-to-parallel conversion, parallel-to-serial conversion, bit stuffing, bit unstuffing, NRZI decoding, and NRZI encoding. Note that the transceiver 10 could be provided outside of the data transfer control device.

An OTG controller 20 (generally speaking: a state controller, hereinafter called OTGC as appropriate) performs various processes for implementing OTG SRP and HNP functions (see FIGS. 2A and 2B). In other words, the OTG controller 20 controls a plurality of states including a state for host operation when the device is operating as host and a state for peripheral operation when the device is operating as a peripheral.

More specifically, state transitions for when the dual-role device is operating as the A-device (see FIGS. 1B and 1C) and state transitions for when it is operating as the B-device are defined within the OTG standard. The OTG controller 20 comprises a state machine for implementing these state transitions. The OTG controller 20 comprises circuits that detect the USB line state, the VBUS level, and the ID pin state. The state machine comprised by the OTG controller 20 causes changes in these states (states such as suspension or idle in the host or peripheral), based on the thus-detected information. The state transitions in this case could be implemented by hardware circuitry or they could be implemented by the firmware setting state commands in the registers. When the state changes, the OTG controller 20 controls VBUS and connects/disconnects the DP and DM pull-up/pull-down resistors, based on the post-transition state. A host controller 50 (hereinafter called HC as appropriate) controls the enabling/disabling of a peripheral controller 60 (hereinafter called PC as appropriate).

An HC/PC switching circuit 30 (HC/PC common circuit) performs switching control over the connections with the host controller 50 or the peripheral controller 60. It also instructs the creation of USB data (DP and DM) lines states, to the transceiver 10. Note that the connection switching control is implemented by an HC/PC selector 32 and the instruction for the creation of line states is implemented by a line state controller 34.

If the OTG controller 20 makes the HC enable signal go active during host operation (in the host state), by way of example, the HC/PC switching circuit 30 (the HC/PC selector 32) connects the transceiver 10 and the host controller 50. If the OTG controller 20 makes the PC enable signal go active during peripheral operation (in the peripheral state), on the other hand, the HC/PC switching circuit 30 connects the transceiver 10 and the peripheral controller 60. This makes it possible for the host controller 50 and the peripheral controller 60 to operate exclusively.

A transfer controller 40 is a circuit that controls data transfer through USB (generally speaking: a bus), and it comprises the host controller 50 (HC) and the peripheral controller 60 (PC).

In this case, the host controller 50 is a circuit that controls data transfer in the role of host during host operation (when the HC enable signal from the OTG controller 20 is active).

In other words, the host controller 50 is connected to the transceiver 10 by the HC/PC switching circuit 30 during host operation. The host controller 50 automatically generates transactions with respect to end points, based on transfer condition information that has been set in a transfer condition register section 72 of the register section 70. Automatic transfer (data transfer by hardware circuitry, without intervention by the processing section) of data (packets) is performed between pipe regions (PIPE0 to PIPEe, hereinafter called PIPE as appropriate) that are allocated in a packet buffer 100 and end points corresponding to those pipe regions.

More specifically, the host controller 50 performs functions such as arbitration between a plurality of pipe transfers, time management in frames, transfer scheduling, and re-send management. It also manages transfer condition information (operation information) for pipe transfers, through the register section 70. It also manages transactions, creates or analyzes packets, and instructs the creation of suspend/resume/reset states.

The peripheral controller 60, on the other hand, is a circuit that controls data transfer in the role of a peripheral during peripheral operation (when the PC enable signal from the OTG controller 20 is active.

In other words, the peripheral controller 60 is connected to the transceiver 10 by the HC/PC switching circuit 30 during peripheral operation. It transfers data between end point regions (EP0 to EPe, hereinafter called EPs as appropriate) that have been allocated in the packet buffer 100, based on transfer condition information that has been set in the transfer condition register section 72 of the register section 70.

More specifically, the peripheral controller 60 manages transfer condition information (operation information) for end point transfers, through the register section 70. It also manages transactions, creates or analyzes packets, and instructs the creation of remote wake-up signals.

Note that an end point can have a unique address allocated thereto and is a point (portion) on the peripheral (device). All data transfer between the host and peripheral (device) is done through these end points. A transaction is configured of a token packet, an optional data packet, and an optional handshake packet.

The register section 70 comprises various registers for performing actions such as data transfer (pipe transfer, end point transfer) control, buffer access control, buffer management, interrupt control, block control, or DMA control. Note that the registers within the register section 70 could be implemented by memory such as RAM, or by D flip-flops or the like. The registers of the register section 70 need not be in a single bank, but could be disposed separately as blocks (such as HC, PC, OTGC, and Xcvr).

The register section 70 comprises the transfer condition register section 72. This transfer condition register section 72 comprises registers that store transfer condition information (transfer control information) for data transfer between pipe regions (PIPE0 to PIPEe) allocated in the packet buffer 100 and end points, during host operation. These transfer condition registers are provided to correspond to the pipe regions of the packet buffer 100.

Note that when the device is operating as a peripheral, endpoint regions (EP0 to EPe) are allocated in the packet buffer 100. Data transfer between the data transfer control device and the host is based on the transfer condition information that has been set in the transfer condition register section 72.

A buffer controller 80 (FIFO manager) performs access (read/write) control and region management for the packet buffer 100. More specifically, it creates and manages accesses and addresses for the packet buffer 100, for the CPU (generally speaking: a processing section, direct memory access (DMA), and USB. It also arbitrates accesses to the packet buffer 100 by the CPU, DMA, and USB.

When the device is operating as host, by way of example, the buffer controller 80 sets (establishes) a data transfer path between an interface circuit 110 (CPU or DMA) and the packet buffer 100 and another data transfer path between the packet buffer 100 and the host controller 50 (USB).

When the device is operating as a peripheral, on the other hand, the buffer controller 80 sets a data transfer path between the interface circuit 110 (CPU or DMA) and the packet buffer 100 and another data transfer path between the packet buffer 100 and the peripheral controller 60 (USB).

The packet buffer 100 (FIFO, packet memory, and buffer) is intended to temporarily store (buffer) data (transmission data or reception data) that is being transferred by USB. This packet buffer 100 could be configured of random access memory (RAM), by way of example. Note that the packet buffer 100 could be provided outside of the data transfer control device (it could also be externally attached memory).

During host operation, the packet buffer 100 is used as a first-in, first-out (FIFO) for pipe transfer. In other words, pipe regions PIPE0 to PIPEe (generally speaking: buffer regions) are allocated in a manner to correspond to the USB (bus) end points. Within the pipe regions PIPE0 to PIPEe is stored data (transmission data or reception data) to be transferred with respect to the corresponding end points.

During peripheral operation, on the other hand, the packet buffer 100 is used as a FIFO for end point transfer. In other words, end point regions EP0 to EPe (generally speaking: buffer regions) are allocated in the packet buffer 100. Within the end point regions EP0 to EPe is stored data (transmission data or reception data) to be transferred with respect to the host.

Note that the buffer regions allocated in the packet buffer 100 (the regions set to pipe regions during host operation or end point regions during peripheral operation) are set to be regions in which the information that is input thereto first is output therefrom first (FIFO regions).

PIPE0 is a pipe region that is dedicated to end point 0 for control transfer, and PIPEa to PIPEe are general-purpose pipe regions that can be allocated to any end points.

In other words, with USB, end point 0 is set to be a dedicated end point for control transfer. It is therefore possible to prevent confusion in the user, by setting PIPE0 to be a dedicated pipe region for control transfer, as in this embodiment. It is also possible to modify the pipe region dynamically to correspond to the end points, by having PIPEa to PIPEe as a pipe region that can be allocated to any end points. This makes it possible to increase the degree of freedom of pipe transfer scheduling, thus enabling more efficient data transfer.

Note that the region size RSize of the buffer region (pipe region or end point region) of this embodiment is set by the maximum packet size MaxPktSize (generally speaking: page size) and the number of pages BufferPage (RSize=MaxPktSize×BufferPage). This makes it possible to set the region size and number of pages of the buffer region as required, enabling more efficient usage of the resources of the packet buffer 100.

The interface circuit 110 is a circuit that performs data transfer between a DMA (system memory) bus or CPU bus, which are other buses that differ from USB, and the packet buffer 100. This interface circuit 110 comprises a DMA handler circuit 112 for performing DMA transfers between the packet buffer 100 and external system memory. It also comprises a CPU interface circuit 114 for performing parallel I/O (PIO) transfers between the packet buffer 100 and an external CPU. Note that the CPU (processing section) could also be incorporated in the data transfer control device.

A clock controller 120 generates various clocks used within the data transfer control device, based on a built-in PLL or an external input clock.

4. Pipe Regions

With this embodiment, pipe regions PIPE0 to PIPEe are allocated during host operation, as shown in FIG. 5A. Data is transferred between these pipe regions PIPE0 to PIPEe and end points in the peripheral.

In this case, the "pipe" of the pipe region of this embodiment has a slightly different meaning from the "pipe" defined by USB (a logical abstraction expressing a linkage between an end point on the device and software on the host, or a logical path).

A pipe region in accordance with this embodiment is allocated in the packet buffer 100 to correspond to each end point possessed by a peripheral connected by USB (bus), as shown in FIG. 5A. As shown in FIG. 5A by way of example, pipe region PIPEa corresponds to end point 1 (bulk IN) of peripheral 1 and pipe region PIPEb corresponds to end point 2 (bulk OUT) of peripheral 1. Similarly, pipe region PIPEc corresponds to end point 1 (bulk IN) of peripheral 2 and pipe region PIPEd corresponds to end point 2 (bulk OUT) of peripheral 2. Furthermore, PIPEe corresponds to end point 1 (interrupt IN) of peripheral 3. Note that PIPE0 is a pipe region that is dedicated to end point 0 for control transfer.

In the example shown in FIG. 5A, USB bulk IN transfer is done between pipe region PIPEa and end point 1 of peripheral 1 and bulk OUT transfer is done between PIPEb and end point 2 of peripheral 1. Similarly, bulk IN transfer is done between PIPEc and end point 1 of peripheral 2 and bulk OUT transfer is done between PIPEd and end point 2 of peripheral 2. Furthermore, interrupt IN transfer is done between PIPEe and end point 1 of peripheral 3.

With this embodiment as configured above, any data transfer (isochronous transfer, bulk transfer, or interrupt transfer) can be done between a pipe region (general-purpose) and the corresponding end point.

With this embodiment, data of a given data unit (a data unit determined by the total size) is transferred between a pipe region and the corresponding end point. A data unit in this case could be considered to be a data unit for a transfer requested by an I/O request packet (IRP) or such a data unit that has been divided into a unit of a suitable size, by way of example. A data transfer of such a data unit (a series of transactions) with respect to an end point can be called a "pipe" in accordance with this embodiment. A region in which this "pipe" of data (transmission data or reception data) is stored forms a pipe region.

Once the transfer of a given data unit through a pipe region has ended, that pipe region can be released. The released pipe region can then be allocated to any end point. With this embodiment as configured above, the correspondences between pipe regions and end points can be changed dynamically.

When the device of this embodiment is operating as a peripheral, end point regions EP0 to EPe are allocated (set) in the packet buffer 100, as shown in FIG. 5B. Data is then transferred between these end point regions EP0 to EPe and the (host controller or system memory).

With this embodiment as configured above, the buffer region of the packet buffer 100 is allocated as pipe regions during host operation or as end point regions during peripheral operation. This makes is possible to use the packet buffer 100 resources in common during host operation and during peripheral operation, enabling a saving in usable storage capacity of the packet buffer 100.

Note that the number of pipe regions and end point regions is not limited to six and thus can be any number.

5. Automatic Short Packet Transfer by Host Controller

If the host is dividing IRP data. (a given data unit) into packets for transfer to an end point, it could happen that the final packet is a short packet (a packet of a size that is less than the maximum packet size), as shown at A1 in FIG. 6A. With the OHCI that manages transactions by the list structure type descriptor shown in FIG. 3A, that descriptor (TD) comprises short packet information that indicates whether or not the final packet is a short packet. The data transfer control device (host controller) can therefore determine whether or not the final packet is a short packet by referring to the short packet information comprised within the descriptor.

However, as mentioned previously, the processing for creating the list structure type descriptor shown in FIG. 3A places a heavy load on the firmware (processing section). For that reason, the host controller 50 of this embodiment employs the configuration shown in FIG. 4 to perform automatic transfer of data between pipe regions and end points.

Incidentally, if automatic transfer of data is done with the configuration of FIG. 4 without using an OHCI descriptor, the short packet information comprised within the OHCI descriptor cannot be used. The firmware therefore has to check whether or not the final packet is a short packet for each transactions, weakening the sense of implementing the automatic transfer of data by the configuration of FIG. 4. In other words, the configuration of FIG. 4 has the advantage of removing the need for control over data transfer, after the firmware has instructed automatic transfer start until the generation of an interrupt. However, that advantage will be lost if the firmware has to check for a short packet in each transaction.

In addition, the following technical problem has been identified with USB OUT transactions. That is to say, it has been established that, if the payload size of the final packet of IRP data is the maximum packet size, as shown at A2 in FIG. 6B, there are some peripherals that are unable to recognize the final end of the IRP data at A3.

If such a peripheral is connected by USB, therefore, it is preferable that the host deliberately transfers a short packet having a data length (payload size) of zero (zero-length packet), to ensure that the peripheral recognizes the final end of the IRP data.

However, the host controller 50 of this embodiment controls data transfer in transaction units. For that reason, the host controller 50 cannot determine the final end of IRP data without some special contrivance. This therefore raises a technical problem in that the firmware has to determine the final end of IRP data, increasing the processing load on the firmware.

With this embodiment of the invention, when the host controller 50 (generally speaking: a transfer controller or data transfer control device, hereinafter the same) performs an automatic transfer of data (packet) corresponding to an end point, it employs a method of transfer by which a short packet (including a zero-length packet) is detected automatically.

More specifically, this embodiment sets the maximum packet size and the total size of the transfer data in registers in the register section 70 of FIG. 4. These registers are transfer condition registers that are provided for each of the pipe regions, and the maximum packet size and total size are set as transfer condition information by the firmware (processing section).

The host controller 50 automatically generates a transaction corresponding to the end point (a service for the end point, configured of a token packet, an optional data packet, and an optional handshake packet), and automatically transfers data from the pipe region to the end point while calculating the remaining data size of the transfer data.

In other words, the host controller 50 decrements the total size (the total size of transfer data for each pipe region), which was set in the register, by an amount corresponding to the transferred data, every time a transaction is completed. It then writes the remaining data size obtained by the calculation (the remaining data size of transfer data for each pipe region) back into the total size register.

When the remaining data size (RemainSize) of the current transaction is less than the maximum packet size (MaxPktSize), the next transaction is automatically generated and the remaining transfer data for the pipe region (the packet buffer 100) is automatically transferred to the endpoint corresponding to that pipe region as a short packet.

With this embodiment of the invention, if the data size of the packet transferred by the current transaction is the maximum packet size and also the remaining data size of the transfer data is zero, the next transaction is automatically generated and a short packet of a data length of zero (payload size is zero) is automatically transferred to the end point. This enables the peripheral to recognize the final end of the IRP data.

The above-described configuration enables this embodiment to detect a short packet without using the short packet information of the OHCI descriptor of FIG. 3A, during a transfer. There is therefore no necessity for the firmware to create OHCI descriptors. In addition, it is no longer necessary for the firmware to monitor the remaining data size to detect a short packet, thereby detecting the final end of IRP data. For that reason, the processing load on the firmware can be greatly reduced, thus enabling more efficient processing.

Figure 7:
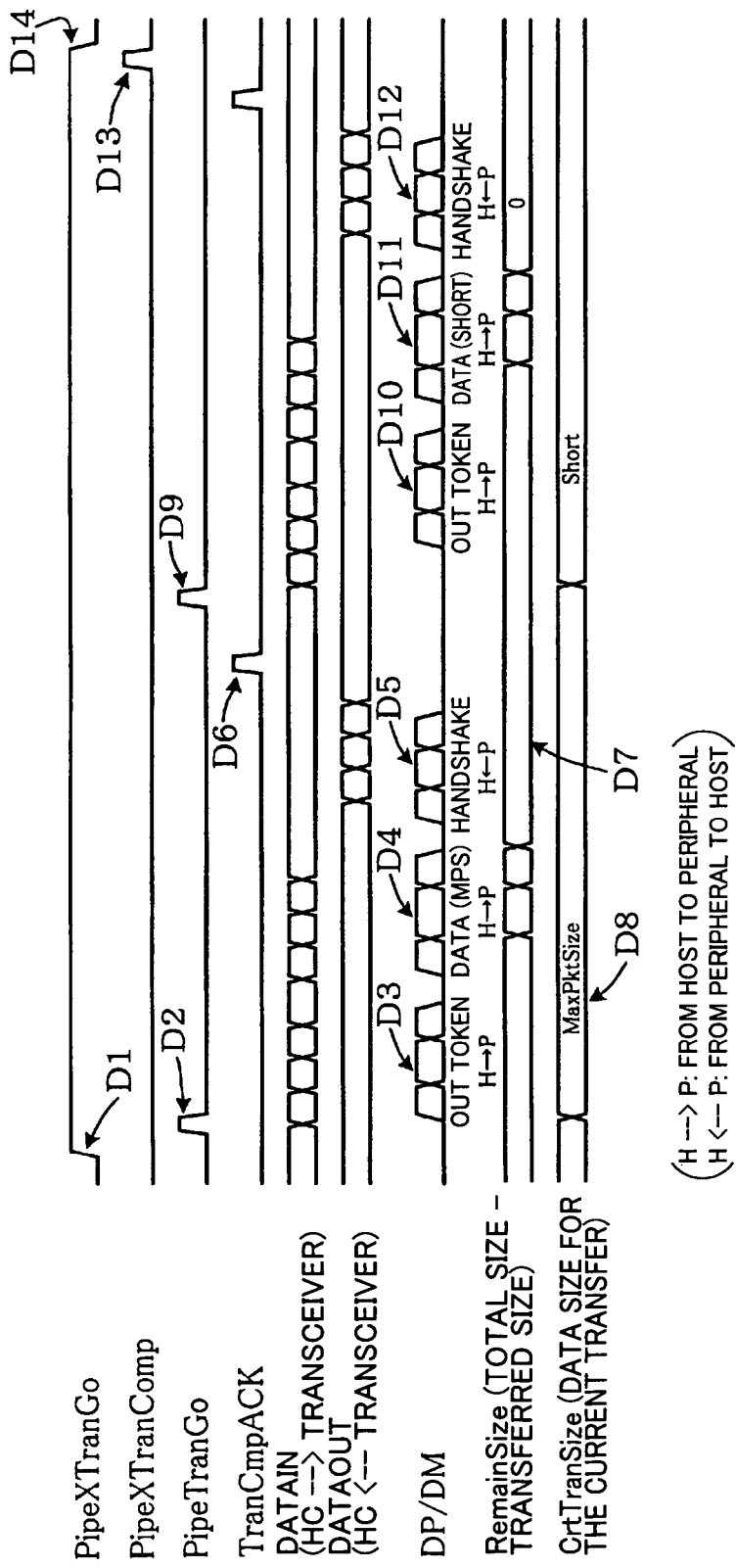
FIG. 7 shows examples of signal waveforms when IRP data transfer for an OUT transaction is completed by a short packet.
Figure 8:
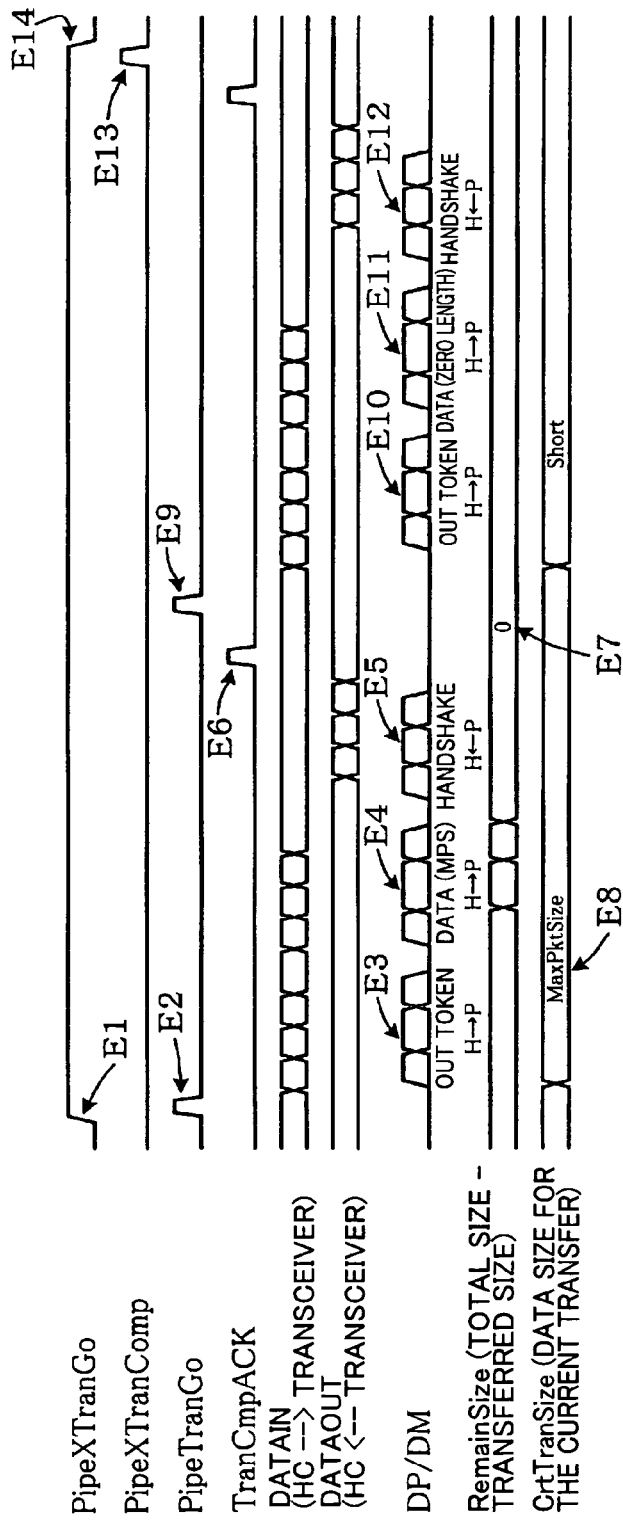
FIG. 8 shows examples of signal waveforms when IRP data transfer for an OUT transaction is completed by a packet of the maximum packet size.

The description now turns to the method used by the host controller 50 to transfer a short packet or zero-length packet, with reference to FIGS. 7 and 8. Note that "H—>P" in these figures represents "transfer from host to peripheral" and "P—>H" represents "transfer from peripheral to host".

FIG. 7 shows examples of the signal waveforms during an OUT transaction when the transfer of IRP data ends with a short packet, as shown in FIG. 6A.

When the firmware instructs the start of the automatic transaction, PipeXTranGo (a transfer request signal from the firmware for PIPEx, which is any of PIPE0 to PIPEe) goes active, as shown at D1, then PipeTranGo (a transfer request signal from the HC sequence management circuit within the host controller 50) goes active, as shown at D2. When that happens, the host controller 50 transfers the OUT token packet to the peripheral at D3 and transfers the data packet (maximum packet size) at D4. When a handshake packet (ACK) is returned from the peripheral at D5, TranCmpACK (a notification signal for normal transfer end, to the HC sequence management circuit) goes active at D6.

In this case, RemainSize (remaining data size=total size−transferred size) is less than MaxPktSize, as shown at D7 in FIG. 7. When that happens, since this is not the end of the IRP and there is still data to be transferred (PipeXtranGo is active), the host controller 50 makes PipeTranGo active at D9, to automatically issue the next transaction.

The host controller 50 transfers the OUT token packet to the peripheral at D10, then transfers a data packet that is a short packet to the peripheral at D11. When the handshake packet (ACK) returns from the peripheral at D12, PipeXTranComp (a transfer end interrupt signal for an IRP data unit, to the firmware) goes active at D13. This interrupt makes it possible to inform the firmware that the entire transfer for that pipe (IRP data) has been completed.

Note that when PipeXTranComp goes active, PipeXTranGo goes inactive at D14 to indicate that that pipe is in a non-transfer state.

With this embodiment as shown in FIG. 7, not only is a series of packets of the maximum packet size transferred automatically, but also a short packet is transferred automatically. This ensures that the period from after PipeTranGo goes active at D1 until the generation of the interrupt at D13 can be used for other processes. This enables more efficient processing by the firmware.

Assume, by way of example, a method in which only a series of packets of the maximum packet size is transferred automatically with no automatic transfer of a short packet, in which case, since the firmware has to detect the final short packet and instruct the transfer thereof, the meaning of the automatic transfer of packets is weakened. The method of this embodiment in which a short packet is transferred automatically can prevent such a situation.

The signal waveforms shown in FIG. 8 are examples when the transfer of IRP data is completed by a packet of the maximum packet size.

The example shown in FIG. 8 differs from that of FIG. 7 in that RemainSize (remaining data size=total size−transferred size) is zero, as shown at E7, and also CrtTranSize (the data size for the current transfer) is the maximum packet size (MaxPktSize), as shown at E8. In this case, the host controller 50 makes PipeTranGo go active at E9 to automatically issue the next transaction, in order to transfer a zero-length packet.

The host controller 50 transfers an OUT token packet to the peripheral, as shown at E10, then transfers a zero-length data packet (empty packet), as shown at E11. When a handshake packet (ACK) returns from the peripheral, as shown at E12, PipeXTranComp goes active at E13. This interrupt makes it possible to inform the firmware that all of the transfers are complete for that pipe. Note that when PipeXTranComp goes active, PipeXTranGo goes inactive at E14.

With this embodiment as shown in FIG. 8, not only is a series of packets of the maximum packet size transferred automatically, but also a zero-length packet is transferred automatically. It is therefore possible to induce the recognition of the final end of IRP data by transferring the zero-length packet to the peripheral, even with a peripheral that cannot recognize the final end of IRP data, as shown at A3 in FIG. 6B. This makes it possible to implement appropriate data transfer.

This embodiment of the present invention makes is possible to automatically create a zero-length packet at the final end of the IRP data, even when the firmware does not manage the IRP data size during the transfer. In other words, the firmware is able to use the period from after PipeTranGo becomes active at E1 until the interrupt is generated at E13, for other processes. This therefore makes it possible to reduce the processing load of the firmware (software), thus reducing the labor required for developing source code.

Note that this embodiment is configured in such a manner that the turning on or off of the automatic transfer of a zero-length packet can be set for each buffer region (pipe region) In other words, an automatic transfer instruction (AutoZeroLen) for a zero-length packet can be set in the transfer condition register that is provided for each buffer region.

Figure 9:
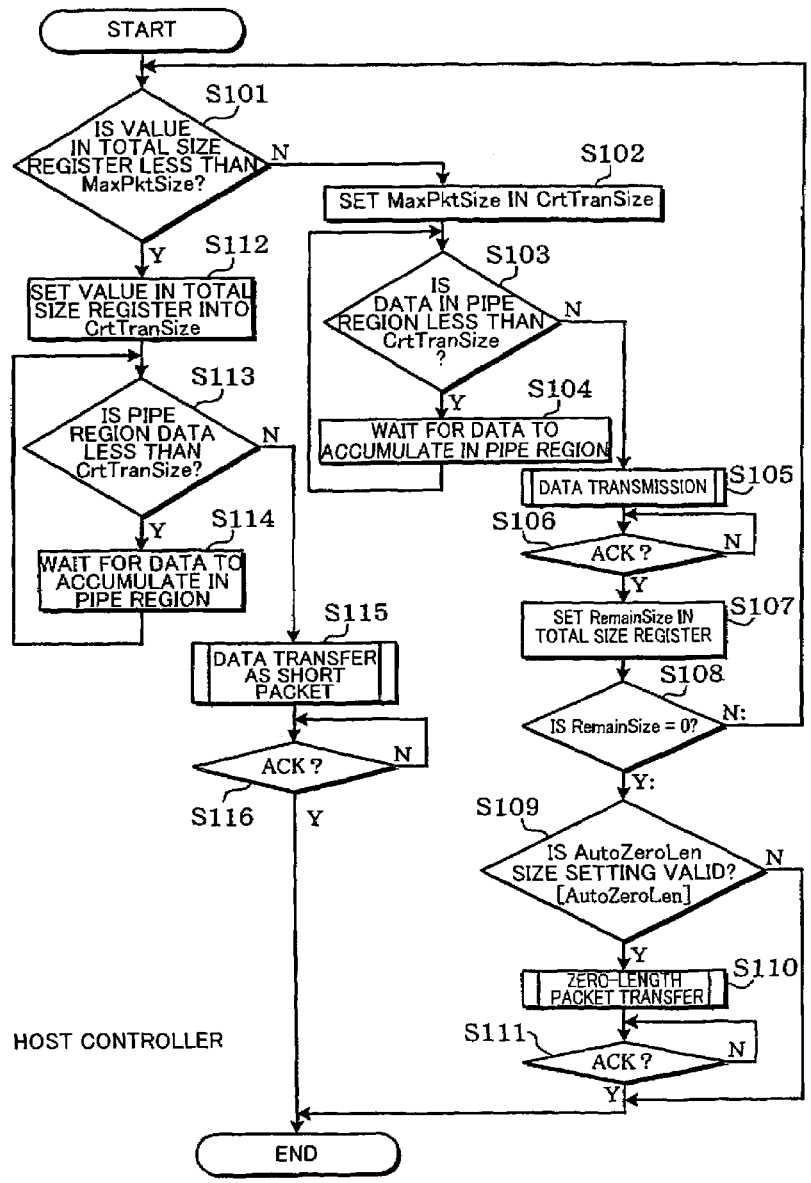
FIG. 9 is a flowchart illustrating the automatic transfer of a short packet or a zero-length packet by the host controller.

A flowchart of the automatic transfer of a short packet and a zero-length packet by the host controller 50 is shown in FIG. 9.

First of all, the system determines whether or not the value in the total size register is less than MaxPktSize (the maximum packet size) (step S101). This total size register is a transfer condition register comprised within the register section 70. The total size of transfer data (the IRP size) is set by the firmware in this total size register as an initial value.

If the value in the total size register is less than MaxPktSize, MaxPktSize is set in CrtTranSize (the size of the packet to be transferred by the current transaction) (step S102) The system then determines whether or not pipe region data is less than CrtTranSize (step S103), and, if it is less than CrtTranSize, it waits until data has accumulated in the pipe region (FIFO) (step S104). If it is less than CrtTranSize, on the other hand, it transmits the pipe region data (packet) (step S105). When ACK returns from the peripheral, RemainSize (remaining data size=total size−transferred size) is set in the total size register (steps S106 and S107).

The system then determines whether or not RemainSize is zero (step S108), and, if it is not zero (if data remains), the flow returns to step S101. If RemainSize is zero (if this is the tail-end of the transfer data), on the other hand, the system determines whether or not the AutoZeroLen (zero-length packet automatic transfer) setting is valid (step S109). If the AutoZeroLen setting is valid, it transmits a zero-length packet, as shown at E11 in FIG. 8 (step S110). The system then waits for ACK from the peripheral (step S111).

If the system has determined in step S101 that the value in the total size register is less than MaxPktSize, it sets the value in the total size register into CrtTranSize (step S112) The system then determines whether or not the pipe region data is less than CrtTranSize (step S113) and, if it is less than CrtTranSize, it waits until data has accumulated in the pipe region (FIFO) (step S114). If is it not less than CrtTranSize, on the other hand, the system transmits the pipe region data as a short packet, as shown at D11 in FIG. 7 (step S115). It then waits for ACK to return from the peripheral (step S116).

Figure 10:
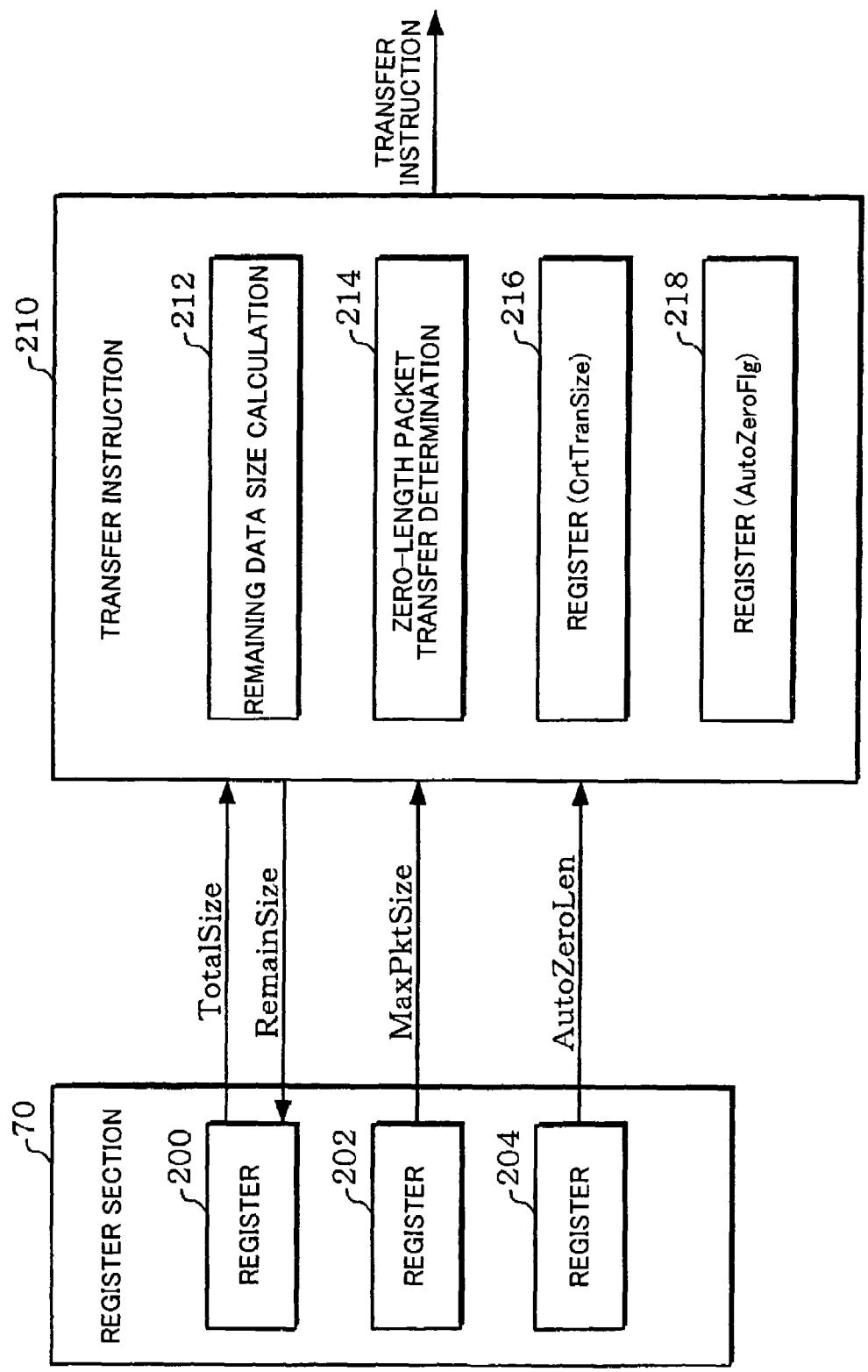
FIG. 10 shows an example of a circuit that implements the automatic transfer of a short packet or a zero-length packet.

An example of the configuration of a circuit that implements the automatic transfer of a zero-length packet is shown in FIG. 10. A transfer instruction circuit 210 of this FIG. 10 is provided within the host controller 50 (the target pipe management circuit).

The transfer instruction circuit 210 comprises a remaining data size calculation circuit 212, a zero-length packet transfer determination circuit 214, a register 216 (CrtTranSize), and a register 218 (AutoZeroFlg).

The transfer instruction circuit 210 instructs the transfer of a packet of the data size specified by CrtTranSize in the register 216. If TotalSize from a register 200 is less than MaxPktSize, TotalSize is set in this register 216 (CrtTranSize); if TotalSize is greater than MaxPktSize, MaxPktSize is set therein.

The remaining data size calculation circuit 212 receives TotalSize and MaxPktSize from registers 200 and 202 (a transfer condition register). It calculates RemainSize, based on TotalSize and MaxPktSize. It then overwrites the thus-obtained RemainSize into the register 200. Note that the total size of the transfer data (IRP data) is set in the register 200 as the initial value.

If the payload size of the final packet of the IRP data is the maximum packet size, as shown at A2 in FIG. 6B, CrtTranSize is set to MaxPktSize and also RemainSize is set to zero. At this time, the zero-length packet transfer determination circuit 214 sets AutoZeroFlg, which is a flag for the register 218. The transfer indication circuit 210 instructs the transfer of a packet of the data size specified by CrtTranSize (=MaxPktSize) This causes the transfer of a packet of MaxPktSize, as shown at E4 in FIG. 8. Since PipeXtranGo remains active even after the packet transfer is complete and TranCmpAck goes active, as shown at E6 in FIG. 8, PipeTranGo goes active again at E9.

Since the AutoZeroFlg flag of the register 218 is raised at that point, the transfer indication circuit 210 forcibly sets CrtTranSize to zero and instructs packet transfer. This causes the transfer of a zero-length packet as shown at E11 in FIG. 8. If the transfer ends normally, the transfer indication circuit 210 clears the flag AutoZeroFlg in the register 218.

The above described configuration enables the recognition of the final end of IRP data, as shown at A3 in FIG. 6B, by the transfer of a zero-length packet, even when the transfer partner is unable to recognize it.

6. Automatic Zero-Length Packet Transfer by Peripheral Controller

The data transfer control device of this embodiment can not only operate as a host but can also operate as a peripheral, due to the OTG dual-role device function thereof, as described with reference to FIGS. 5A and 5B. When the device is operating as a peripheral, the peripheral controller 60 of FIG. 4 controls data transfer.

It has been determined that the problem described below occurs when the data transfer control device of this embodiment is operating as a peripheral. That is to say, it has become clear that there are hosts that are unable to recognize the final end of IRP data in a USB IN transaction, as shown at A3 in FIG. 6B, if the payload size of the final packet of IRP data is the maximum packet size, as shown at A2.

If there is such a host, the host could transmit the IN token even if there is no more data (DMA transfer data) to be transmitted from the peripheral to the host. It is therefore preferable that the peripheral transmits a zero-length packet to the host, to make the host recognize the final end of IRP data.

In such a case, a method could be considered in which the firmware determines whether or not to transmit a zero-length packet in answer to an IN token from the host, every time a packet is transmitted after DMA transfer from the system memory to the packet buffer 100 is complete.

However, the use of this method would increase the processing load on the firmware, making it impossible to make the data transfer efficient.

With this embodiment, the peripheral controller 60 (generally speaking: a transfer controller or data transfer control device, hereinafter the same) employs a method by which a zero-length packet is transferred automatically when an IN token has been received from the host after DMA transfer is complete.

More specifically, this embodiment ensures that the DMA handler circuit 112 of FIG. 4 (generally speaking: an interface circuit) performs direct memory access (DMA) transfer between a system memory bus (generally speaking: another bus) and the packet buffer 100.

When the DMA transfer is complete and there is no more data to be transferred (the remaining data in the endpoint region of the packet buffer 100 is zero), the peripheral controller 60 starts automatic transfer of a zero-length packet to the host in response to an IN token from the host.

This embodiment of the above described configuration enables recognition of the final end of IRP data by transmitting a zero-length packet to the host, even when the host is unable to recognize the final end of IRP data. This makes it possible to implement appropriate data transfer.

With this embodiment, this automatic transfer of the zero-length packet is implemented without involving firmware processing. It therefore enables an increase in efficiency of the firmware processing.

Figure 11:
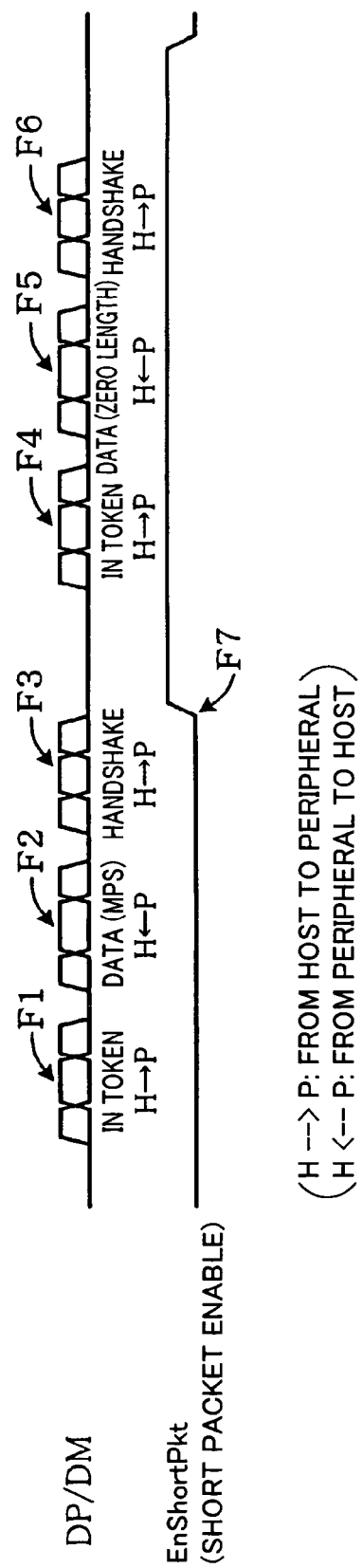
FIG. 11 shows examples of signal waveforms when IRP data transfer for an IN transaction is completed by a packet of the maximum packet size.

The description now turns to the method of transferring a zero-length packet, with reference to FIG. 11.

FIG. 11 shows examples of the signal waveforms during an IN transaction when the transfer of IRP data ends in a packet of the maximum packet size, as shown in FIG. 6B.

When the host transfers an IN token packet to the peripheral controller 60, as shown at F1, the peripheral controller 60 transfers a data packet (of maximum packet size) to the host at F2. A handshake packet (ACK) returns from the host at F3.

In this case, assume that the data packet of maximum packet size shown at F2 is the final packet of IRP data, by way of example. At this point, if the host that is the transfer partner is unable to recognize the final end of IRP data, it transfers an IN token to the peripheral controller 60 at F4, even though the final end of IRP data has been reached.

With this embodiment, EnShortPkt (short packet transfer permission) becomes active as shown at F7, to make this host recognize the final end of the IRP data. In other words, EnShortPkt becomes active when the payload size of the packet in the previous transaction shown at F2 is the maximum packet size, DMA transfer is complete, and also the remaining data in the end point region (generally speaking: buffer region) of the packet buffer 100 is zero. This prompts the peripheral controller 60 to automatically transfer a zero-length packet (a type of short packet) in answer to the IN token from the host, as shown at F4 and F5. The host that receives this zero-length packet recognizes that this is the final end of IRP data and transfers a handshake packet (ACK) at F6.

The thus-configured embodiment succeeds in causing the host to recognize the final end of IRP data in an appropriate manner, without increasing the processing load on the firmware, by the automatic transfer of a zero-length packet.

Note that the configuration of this embodiment is such that the setting on or off of the automatic transfer of a zero-length packet by the peripheral controller 60 could be done by a setting in the buffer region (end point region).

Figure 12:
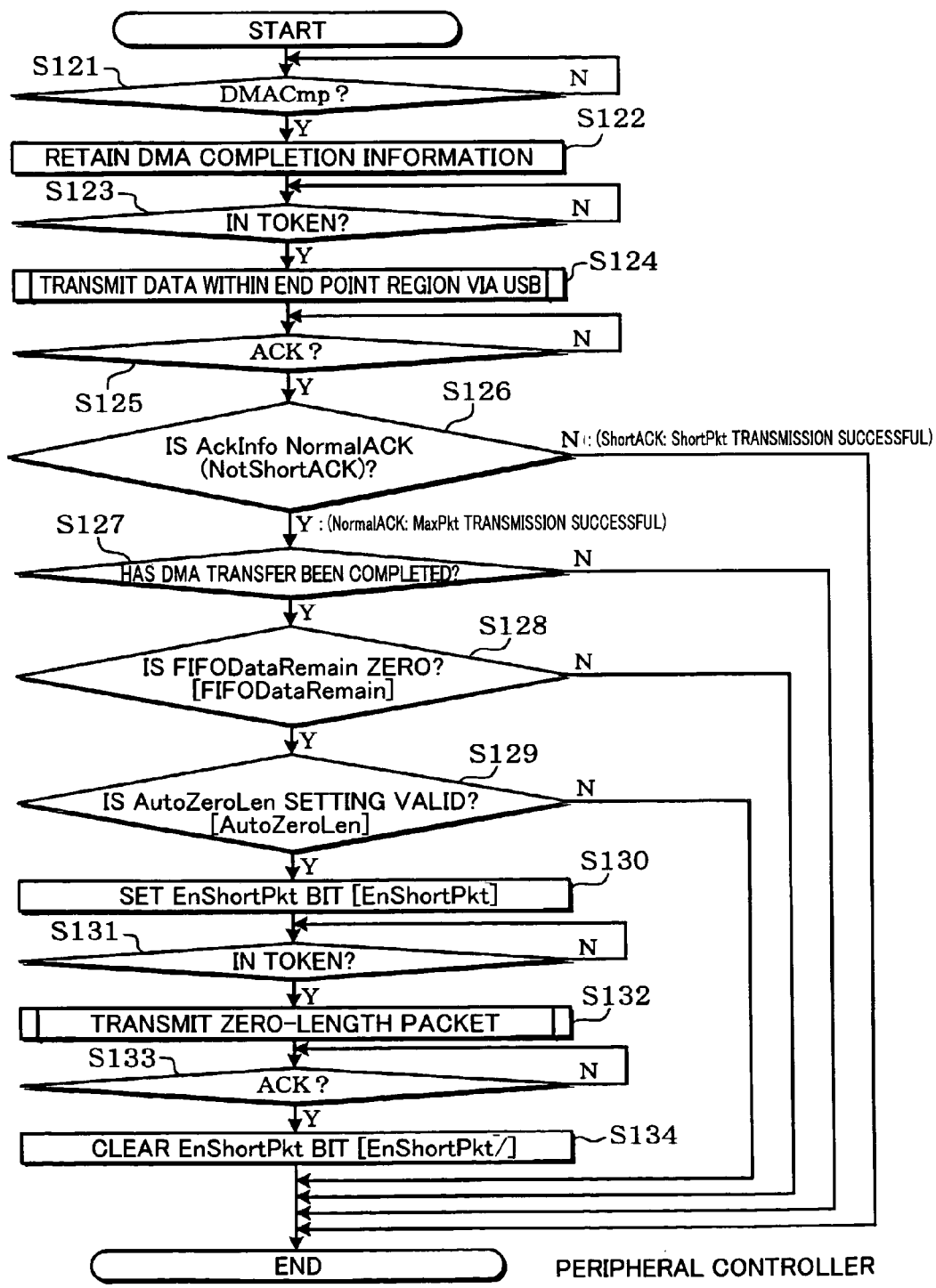
FIG. 12 is a flowchart illustrating the automatic transfer of a zero-length packet by the peripheral controller.

A flowchart of the automatic transfer of a zero-length packet by the peripheral controller 60 is shown in FIG. 12.

First of all, the system determines whether or not DMA transfer has been completed and, if it has been completed, it retains DMA completion information (steps S121 and S122). When an IN token has been received from a host, the system transmits data of the end point region by USB to the host and waits for ACK to return from the host (steps S123, S124, and S125).

The system then determines whether or not ACKInfo (ACK information) is NormalACK (step S126). In other words, with this embodiment, when a packet of the maximum packet size is transmitted to the host and ACK has returned from the host in answer thereto, NormalACK (information indicating that the transmission of the packet of the maximum packet size has succeeded) is set in ACKInfo. If a short packet is transmitted to the host and ACK has returned from the host in answer thereto, on the other hand, ShortACK (information indicating that the transmission of a short packet has succeeded) is set in ACKInfo.

If ACKInfo (ACK information) is NormalACK, the system determines whether or not DMA transfer is complete (step S127) This determination is based on the information retained by step S122.

If the DMA transfer is complete, the system determines whether or not FIFODataRemain (remaining data size of buffer region) is zero (step S128). In other words, it determines whether or not the amount of data to be transferred is zero.

If FIFODataRemain is zero, the system determines whether or not the AutoZeroLen (zero-length packet automatic transfer) setting is valid (step S129). This AutoZeroLen is set in a register (transfer condition register) of the register section 70 by the register section 70.

If the AutoZeroLen setting is valid, the EnShortPkt (short packet transfer permission) bit is set (step S130). The system then waits for the IN token to return from the host and, if it does return, it transmits a zero-length packet (steps S131 and S132). When ACK returns from the host, the EnShortPkt bit is cleared (steps S133 and S134).

Figure 13:
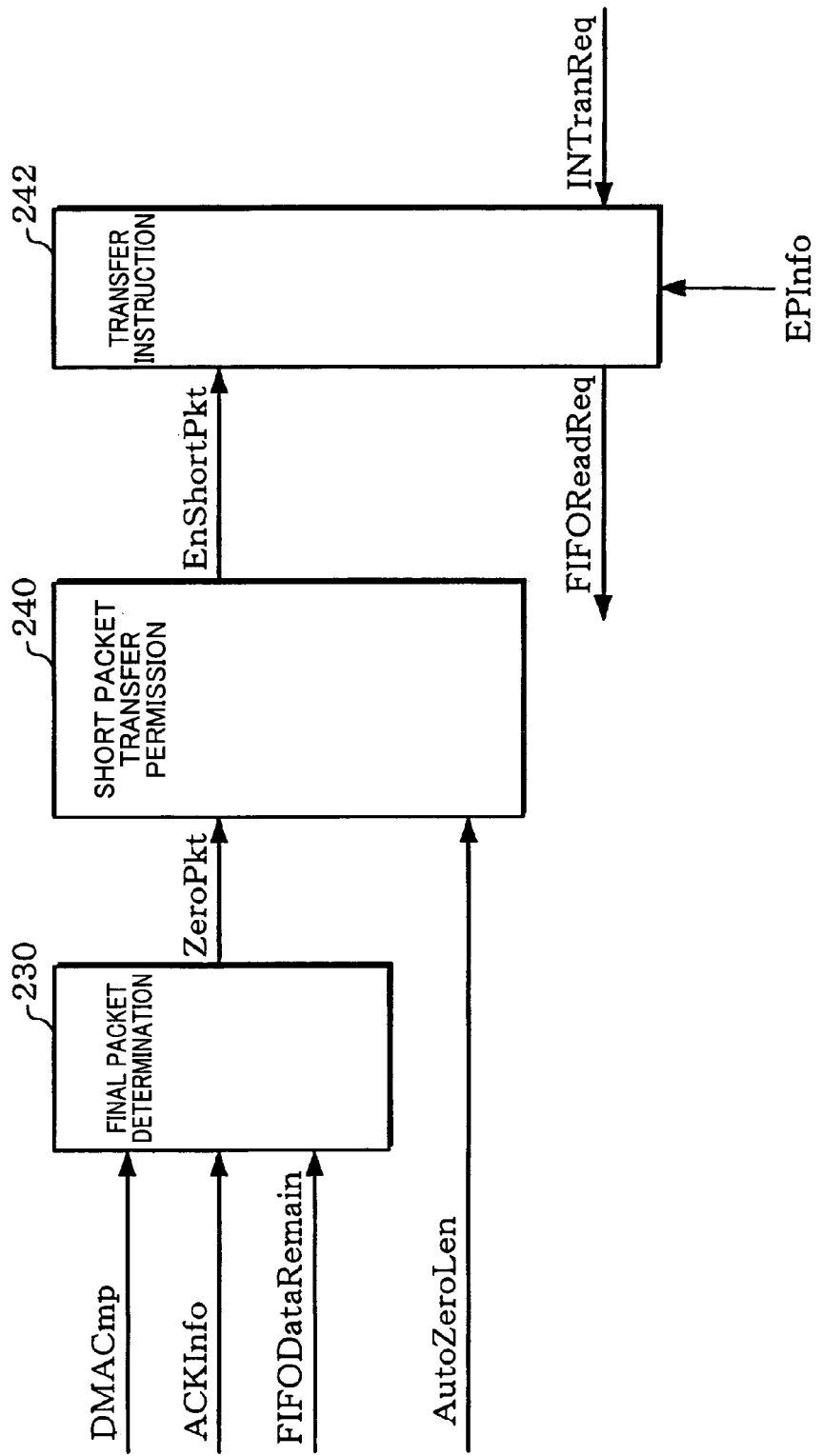
FIG. 13 shows an example of a circuit that implements the automatic transfer of a zero-length packet.

An example of the configuration of a circuit that implements the automatic transfer of a zero-length packet is shown in FIG. 13. This circuit is provided within the peripheral controller 60 (transaction management circuit).

A final packet determination circuit 230 receives DMAcmp (DMA transfer complete), ACKInfo (ACK information indicating whether the transmission of a packet of the maximum packet size by the previous transaction was successful, or whether the transfer of a short packet was successful), and FIFODataRemain (remaining data size in the buffer region). It determines whether or not packets of the maximum packet size have been completed. In other words, ZeroPkt goes active when DMA transfer has been completed (DMAcmp), packets for nine transactions are packets of the maximum packet size (ACKInfo), and the remaining data size in the buffer region (FIFODataRemain) is zero.

A short packet transfer permission circuit 240 receives ZeroPkt and AutoZeroLen (zero-length packet automatic transfer) If both ZeroPkt and AutoZeroLen are active, EnShortPkt (short packet transfer permission) goes active.

If INTranReq (an IN transaction request from the host) is received while EnShortPkt is active, a transfer instruction circuit 242 makes FIFOReadReq (a read request for data in the buffer region) go active. Since there is no data in the buffer region (end point region) and it is empty in such a case, the result is as if a zero-length packet has been transferred in reply to an IN token from the host.

7. Transfer Condition Registers (Common Registers)

Figure 14:
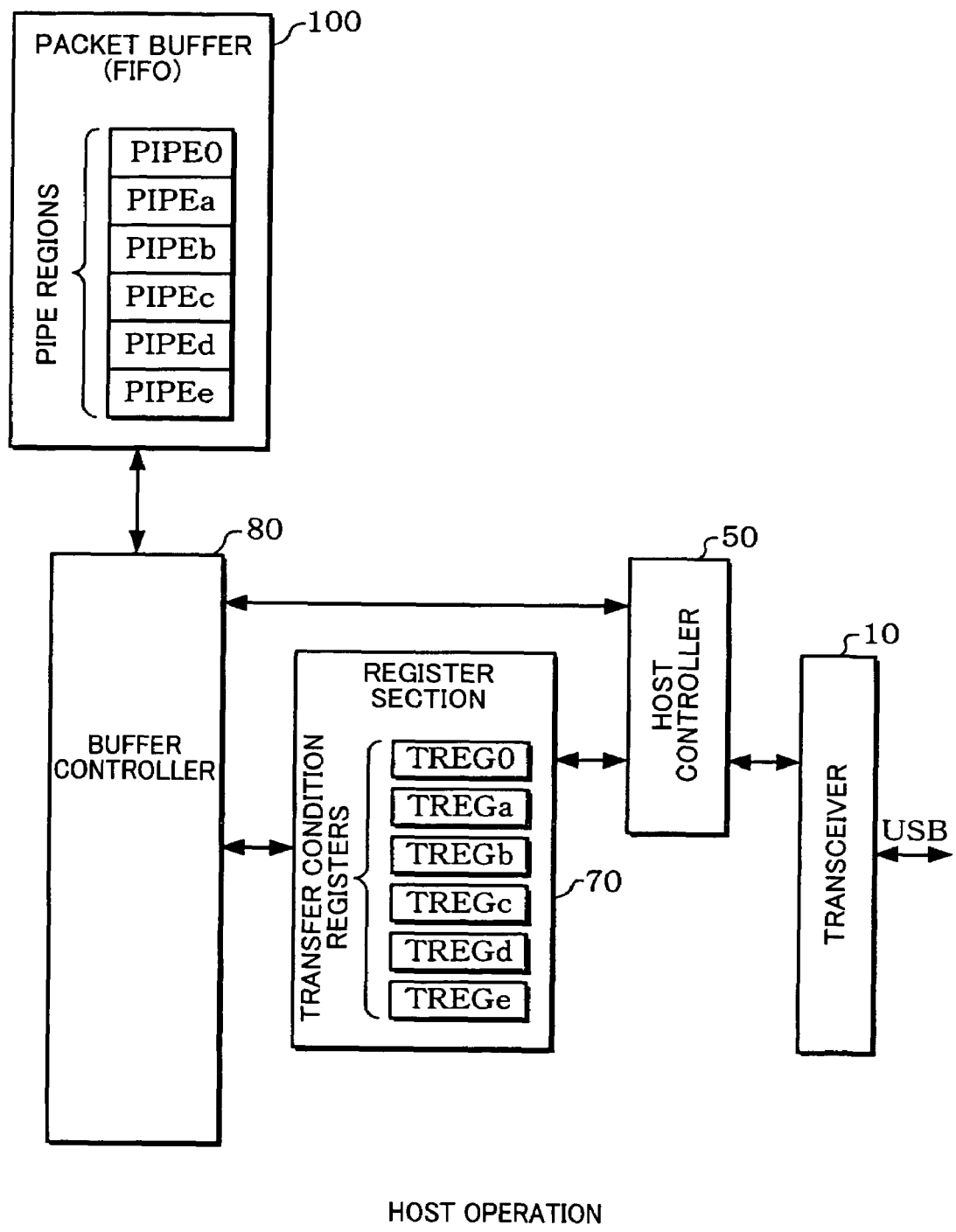
FIG. 14 is illustrative of the operation of the data transfer control device as a host.

When the device of this embodiment is operating as a host, transfer condition information (such as transfer direction, transfer type, maximum packet size, or number of pages) for data transfer to be performed between pipe regions PIPE0 to PIPEe and end points is set in transfer condition registers TREG0 to TREGe, as shown in FIG. 14. In other words, transfer condition information for PIPE0, PIPEa, PIPEb, PIPEc, PIPEd, and PIPEe is set (stored) in TREG0, TREGa, TREGb, TREGc, TREGd, and TREGe. This setting could be done by firmware (the CPU), by way of example.

The host controller 50 (generally speaking: a transfer controller) issues each transaction with respect to an end point, based on the transfer condition information that has been set in the transfer condition registers TREG0 to TREGe. Data (packets) is transferred automatically between each pipe region and the corresponding end point.

With the thus-configured embodiment, a transfer condition register is provided for each pipe region (buffer region) and pipe transfer for each pipe region (transfer of a given data unit) is done automatically by the host controller 50, based on the transfer condition information that has been set in these transfer condition registers. The firmware (driver or software) therefore need not be involved in data transfer control after setting the transfer condition information in the transfer condition registers, until data transfer is complete. An interrupt is generated when the pipe transfer of the given data unit is complete, to inform the firmware than the transfer is complete. This enables a large reduction in the processing load on the firmware (CPU).

Figure 15:
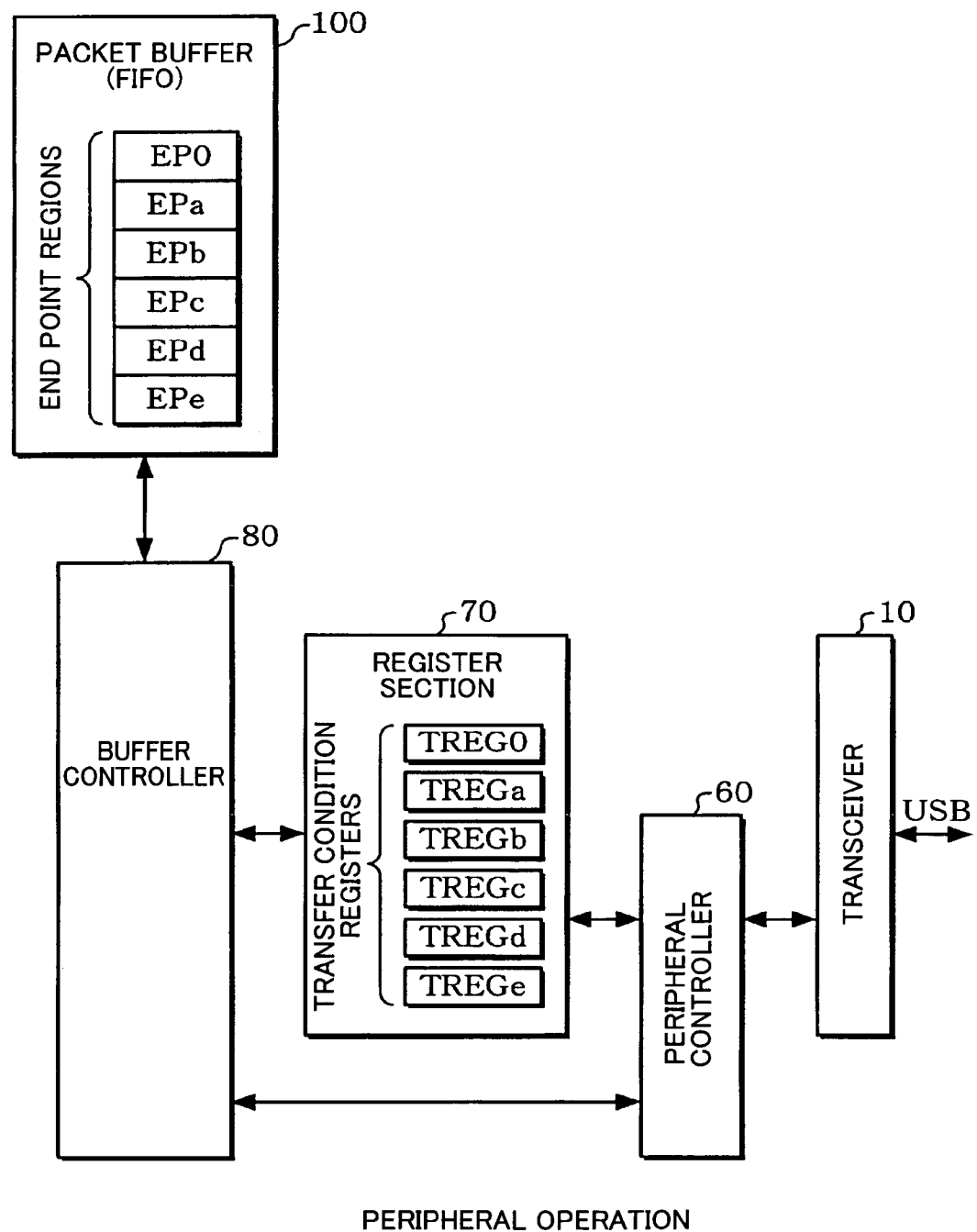
FIG. 15 is illustrative of the operation of the data transfer control device as a peripheral.

Note that when the device of this embodiment is operating as a peripheral, transfer condition information (such as transfer direction, transfer type, maximum packet size, or number of pages) for data transfer to be performed between the end point regions EP0 to EPe and the host is set in the transfer condition registers TREG0 to TREGe, as shown in FIG. 15. The peripheral controller 60 (generally speaking: a transfer controller) performs data transfer between the end point region and the host, based on the transfer condition information that has been set in the transfer condition registers TREG0 to TREGe.

With the thus-configured embodiment, the transfer condition registers TREG0 to TREGe are used in common during operation as host and during operation as peripheral. This makes it possible to save on resources for the register section 70, thus making the data transfer control device smaller.

An example of the configuration of the registers of the register section 70 is shown in FIG. 16. Note that some of the registers of the register section 70 could be comprised within individual blocks (such as OTGC, HC, PC, or Xcvr).

As shown in FIG. 16, the transfer condition registers (TREG0 to TREGe) of the register section 70 comprise HC/PC common registers (common transfer condition registers) used both during host operation (HC, PIPE) and during peripheral operation (PC, EP). It also comprises HC (PIPE) registers (transfer condition registers for the host) that are used only during host operation. It further comprises PC (EP) registers (transfer condition registers for the peripheral) that are used only during peripheral operation. In addition, it comprises access control registers which are registers for controlling access to the packet buffer (FIFO) and which are used both during host operation and during peripheral operation.

While a dual-role device is operating as a host, for example, the host controller 50 (HC) transfers data (packets), based on transfer condition information set in the HC/PC common registers and the HC registers.

During operation as a peripheral, on the other hand, the peripheral controller 60 (PC) transfers data (packets), based on transfer condition information set in the HC/PC common registers and the PC registers.

During both host operation and peripheral operation, the buffer controller 80 performs access control (such as generation of read/write addresses, data read/write, access arbitration) to the packet buffer 100, based on the common access control registers.

The data transfer direction (such as IN, OUT, or SETUP), the transfer type (transaction type, such as isochronous, bulk, interrupt, or control), end point number (the number linked to an end point in a USB device), and the maximum packet size (maximum payload size of a packet that an endpoint can transmit or receive, the page size) are set in the HC/PC common registers of FIG. 16. In addition, the number of pages in the buffer region (pipe region or end point region) (number of screens of the buffer region) is set therein. Furthermore, information that instructs the presence or absence of a DMA connection (presence or absence of the use of DMA transfer by the DMA handler circuit 112) is set therein. Similarly, an zero-length packet automatic transfer instruction (an instruction as to whether or not to transfer a zero-length packet automatically when the transfer specified by the total size ends with the maximum packet size) is set therein.

The token issue period for interrupt transfer (the period or interval at which interrupt transactions are activated) is set in the HC (PIPE) registers. The number of continuous executions of transactions (information that sets transfer ratios between the pipe regions, the number of continuous executions of transactions for each pipe region) is also set. The function address (USB address of a function having an end point) and the total size of the transfer data (total size of data to be transferred through each pipe region, in data units such as IRP) are also set. The automatic transaction start instruction (a start instruction for automatic transaction with respect to the host controller) is also set. The automatic control transfer mode instruction (an instruction for a mode that automatically issues the control transfer setup stage, data stage, and status stage) is set.

The end point enable (an instruction that enables or disables an end point) and a handshake specification (a specification of the handshake to be used for each transaction) are set in the PC (EP) registers.

The buffer and I/O port (the I/O port for PIO transfer by the CPU) is set in the common access control registers for packet buffer (FIFO). A buffer full/empty (notification of whether each buffer region is full or empty) and a buffer remaining data size (the remaining data size for each buffer region) are also set.

The register section 70 comprises registers such as interrupt-related registers, block-related registers, and a DMA control register.

The interrupt-related registers comprise an interrupt status register that indicates the interrupt status (cause) to the CPU, and an interrupt enable register that sets enabled/disabled (non-masked, masked) for interrupts. Note that the interrupts include interrupts relating to the OTG controller 20, to the host controller 50, and to the peripheral controller 60.

The block-related registers comprise an inter-block common register that is used in common between blocks and block registers that are used within the blocks (Xcvr, OTGC, HC, and PC).

The inter-block common register is a register that instructs the reset of each block. The block registers include a register for controlling the transceiver 10 (Xcvr), a state command register for the OTG controller 20 (OTGC), a state command register for the host controller 50 (HC), and a register for setting frame number.

With this embodiment as described above, registers used both during host operation and during peripheral operation (HC/PC common registers and common access control registers) are provided in the register section 70. This enables a reduction in size of the register section 70, in comparison with the case in which completely separate registers are provided for when the device is operating as a host and when it is operating as a peripheral. Access addresses to the common registers, as seen from the firmware (driver) operating on the CPU, can be made the same for host operation and peripheral operation. The firmware can therefore use the same addresses for managing these common registers, enabling a simplification of the firmware processing.

Since HC registers and PC registers are provided, specific transfer conditions can be set for host operation (PIPE) transfer and peripheral operation (EP) transfer. For example, it is possible to issue the interrupt transfer token at any desired timing during host operation, by setting the token issue period. It is also possible to set the transfer ratios between pipe regions as required during host operation, by setting the numbers of continuous executions. Similarly, it is possible to set any data size to be transferred automatically through a pipe region during host operation, by setting the total size therefore. The firmware is configured in such a manner that it can instruct the start of automatic transactions and instruct the turning on and off of automatic control transfer mode, during host operation.

8. Automatic Transactions

Figure 17:
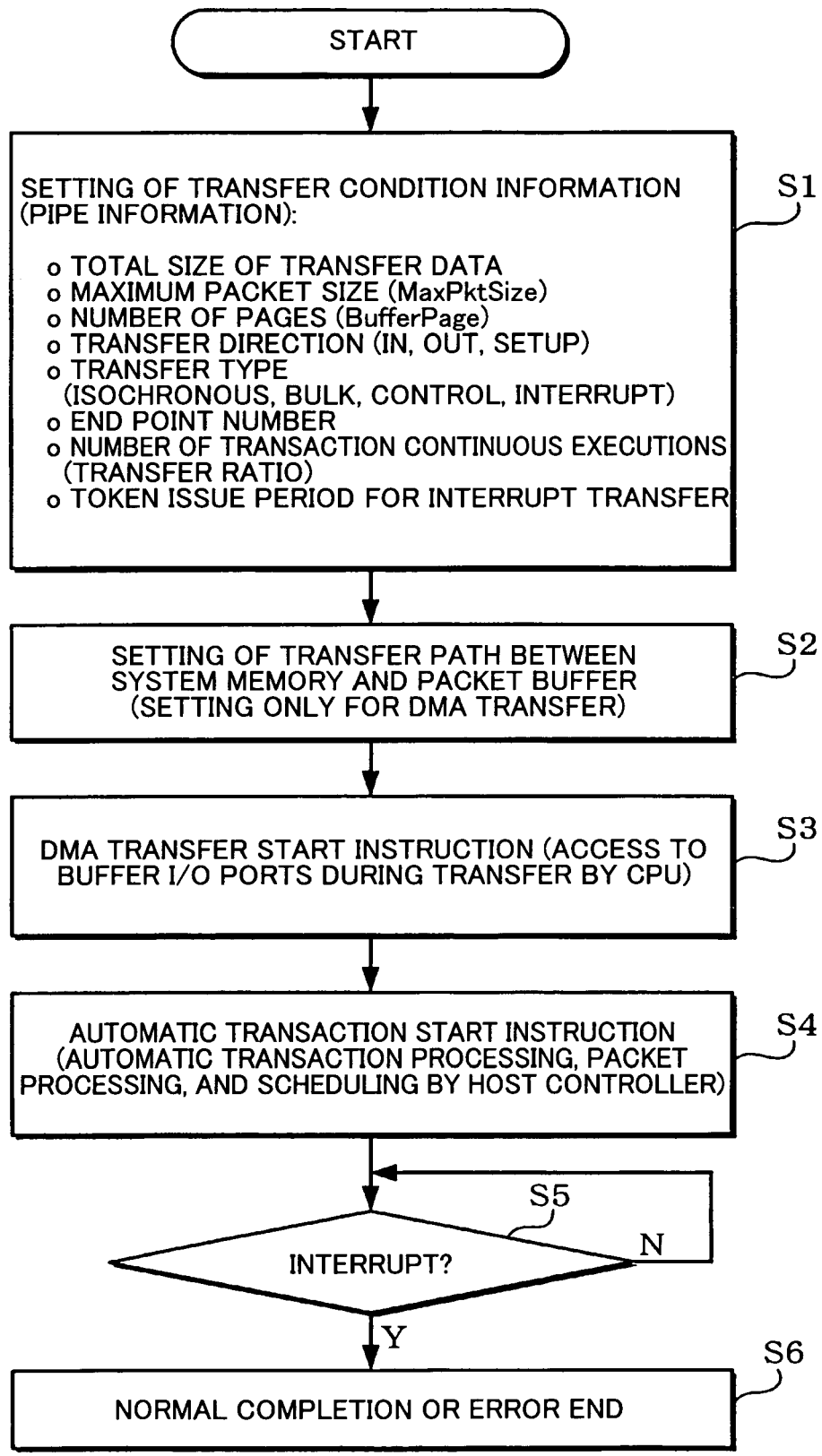
FIG. 17 is a flowchart illustrating a processing example of the firmware.

A typical flowchart of firmware processing during the processing of automatic transaction (IN or OUT) of the host controller 50 is shown in FIG. 17.

First of all, the firmware (processing section or driver) sets the transfer condition information (pipe information) in the transfer condition registers described with reference to FIG. 16 (step S1). More specifically, data such as the total size of the transfer data, the maximum packet size (MaxPktSize), the number of pages (BufferPage), the transfer direction (IN, OUT, or SETUP), the transfer type (isochronous, bulk, control, or interrupt), the end point number, the number of consecutive transaction executions for the pipe region (transfer ratio), the token issue period for interrupt transfer, and zero-length packet automatic transfer (AutoZeroLen) are set in the transfer condition registers.

The system then sets a transfer path between the external system memory and the packet buffer 100 (step S2). In other words, it sets a DMA transfer path through the DMA handler circuit 112 of FIG. 4.

The firmware then instructs DMA transfer start (step S3) In other words, it makes the DMA transfer start instruction bit of the DMA control register of FIG. 16 go active. Note that transfer by CPU enables access to the packet buffer 100 by access to the buffer I/O ports of FIG. 16.

The firmware then instructs the automatic transaction start (step S4). In other words, it makes the automatic transaction start instruction bit of the HC register (pipe register) of FIG.

16 go active. This causes the host controller 50 to perform automatic transaction processing, packet processing (packet creation/analysis), and scheduling processing. In other words, the host controller 50 automatically transfers data specified by the total size, using packets of a payload of the maximum packet size and in the direction specified by the transfer direction.

Note that the processes of steps S3 and S4 can be done in either order, so that the DMA transfer start can be instructed after the automatic transaction start is instructed.

The firmware waits until the generation of an interrupt informing of the completion of the pipe transfer (step S5). When the interrupt is generated, the firmware checks the interrupt status (cause) in the interrupt-related register of FIG. 16. The processing is either completed normally or ends in error (step S6).

Simply by setting transfer condition information for each pipe region (step S1) then instructing DMA transfer start (step S3) and automatic transaction start (step S4), the firmware of the thus-configured embodiment can rely on the hardware circuitry of the host controller 50 performing subsequent data transfer processing automatically. This therefore reduces the processing load on the firmware in comparison with the method that conforms to OHCI, described with reference to FIGS. 3A and 3B, making it possible to provide a data transfer control device that is optimal as a portable device that incorporates a limited-capability CPU.

9. Detailed Configurational Examples of Blocks

The description now turns to details of the configurations of the various blocks.

9.1 OTG Controller

Figure 18:
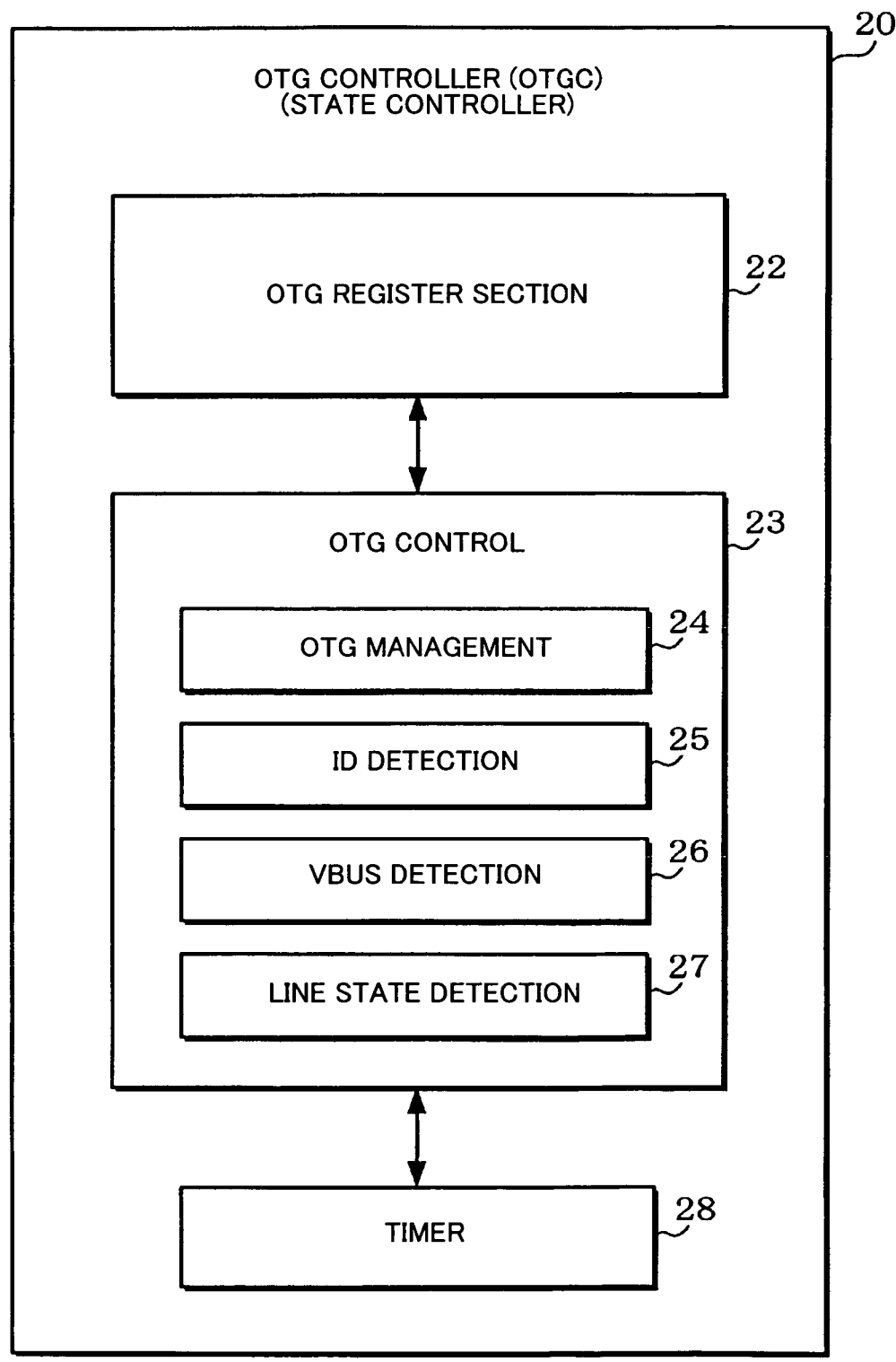
FIG. 18 shows a detailed example of the configuration of the OTG controller.

An example of the configuration of the OTG controller 20 is shown in FIG. 18.

The OTG controller 20 comprises an OTG register section 22. This OTG register section 22 comprises monitor and control registers for the OTG controller 20. It also comprises a circuit that decodes OTG state commands that are written by the firmware (CPU).

The OTG controller 20 also comprises an OTG control circuit 23. This OTG control circuit 23 comprises an OTG management circuit 24 that manages the OTG state, an ID detection circuit 25 that detects the voltage level of the ID pin, and a VBUS detection circuit 26 that detects the voltage level of VBUS. It also comprises a line state detection circuit 27 that detects the USB bus state (such as reset or resume, based on line state information (such as J, K, or SE0) from the transceiver 10.

The OTG controller 20 also comprises a timer 28 that measures time. The line state detection circuit 27 bases the detection of the USB bus state on line state information from the transceiver 10 and time measurement information from the timer 28.

Information to be detected for changing the OTG state is ID, the VBUS voltage level, and the DP/DM line state. The OTG controller 20 of this embodiment detects this information and transfers it to the firmware (CPU) via monitor registers.

The firmware changes its own state, based on the thus-detected information, and uses the OTG state command to inform the OTG controller 20 of the next state to change to.

The OTG controller 20 decodes the OTG state command then performs VBUS drive control and connection control over the pull-up/pull-down resistors, based on the decoded result, to implement the SRP or HNP described with reference to FIGS. 2A and 2B.

With this embodiment as described above, the OTG controller 20 is in charge of OTG control in each state so that the firmware can concentrate on state transition management. As a result, the processing load on the firmware (CPU) can be reduced in comparison with the case in which all state control is implemented by the firmware, and it is also possible to develop efficient firmware.

Note that the determination of OTG state transitions could be done by hardware circuitry, not the firmware. Alternatively, substantially all of the processing of the OTG controller 20 (such as processing other than VBUS control, pull-up/pull-down resistor control, ID detection, VBUS detection, and line state detection) could be implemented by firmware (software).

9.2 Host Controller and Peripheral Controller

Figure 19A:
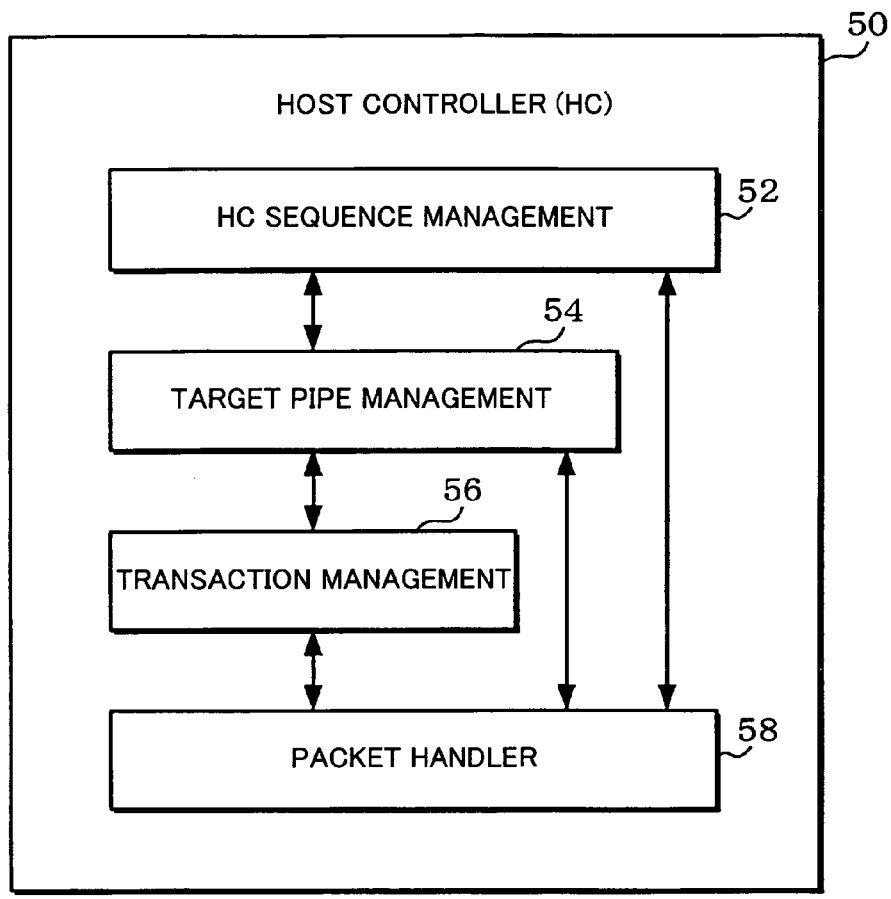
FIGS. 19A and 19B show detailed examples of the configurations of the host controller and the peripheral controller.
Figure 19B:
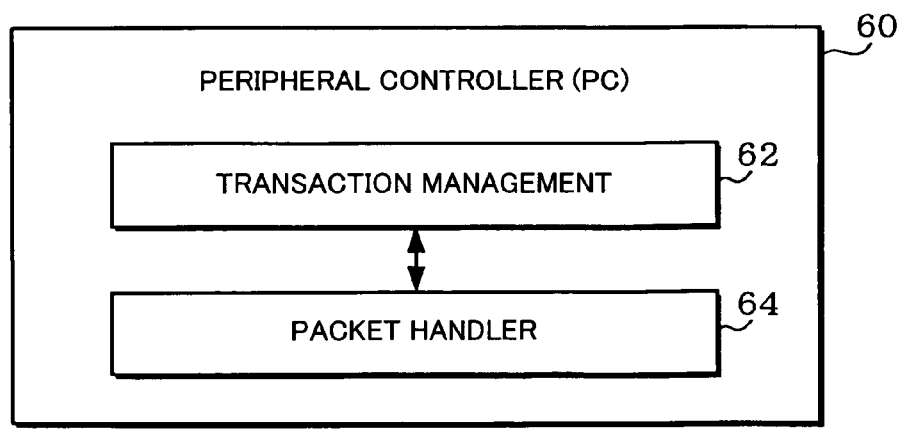

An example of the configuration of the host controller 50 is shown in FIG. 19A.

The host controller 50 comprises an HC sequence management circuit 52. This HC sequence management circuit 52 performs functions such as arbitration of pipe transfer (data transfer using the pipe region), time management, scheduling of pipe transfer, and re-transmission management.

More specifically, the HC sequence management circuit 52 instructs the transmission of the frame number count and a start-of-frame (SOF) packet. It performs processing to ensure that isochronous transfer is executed preferentially at the start, and processing to ensure that interrupt transfers are handled preferentially after isochronous transfers. It also processes each pipe transfer instruction in accordance with the pipe transfer sequence. Furthermore, it manages the number of continuous executions of transactions and confirms the remaining frame time. In addition, it performs processing to cope with handshake packets (ACK or NAK) returning from the peripheral. It also performs error processing during transaction execution.

The host controller 50 comprises a target pipe management circuit 54. This target pipe management circuit 54 performs processing such as the handling of transfer condition information that has been set in the transfer condition registers of the register section 70.

More specifically, the target pipe management circuit 54 selects transfer condition information and creates interrupt signals. After automatic transaction start has been instructed, it loads the total size of transfer data for that pipe region. It then performs count processing (decrementation) of the remaining transfer data size. It also confirms the state of the buffer (FIFO) region during the transmission/reception of data to the buffer controller 80. It also instructs a transaction management circuit 56 to perform transfers. Furthermore, it determines the reception of an unexpected short packet or the reception of a packet of larger than the maximum packet size. If a mode in which a zero-length packet is transferred automatically has been set, it instructs the transaction management circuit 56 to transmit the final zero-length packet. It also manages the sequencing for automatic control transfer mode.

The host controller 50 comprises the transaction management circuit 56. This transaction management circuit 56 classifies transfer packets and manages the transfer sequence (transaction sequence management). It also monitors for time-out. Furthermore, it performs transaction end notification processing.

The host controller 50 comprises a packet handler circuit 58. This packet handler circuit 58 creates or analyzes packets. It also performs PID checks and decodes/encodes CRC bits. It reads or writes the payloads of packets in the buffer region, and transmits SOF packets. It also counts the transmission/reception data.

An example of the configuration of the peripheral controller 60 is shown in FIG. 19A.

The peripheral controller 60 comprises a transaction management circuit 62 and a packet handler circuit 64. The transaction management circuit 62 and the packet handler circuit 64 perform substantially the same processing as the transaction management circuit 56 and the packet handler circuit 58 of the host controller 50.

9.3 Buffer Controller

Figure 20:
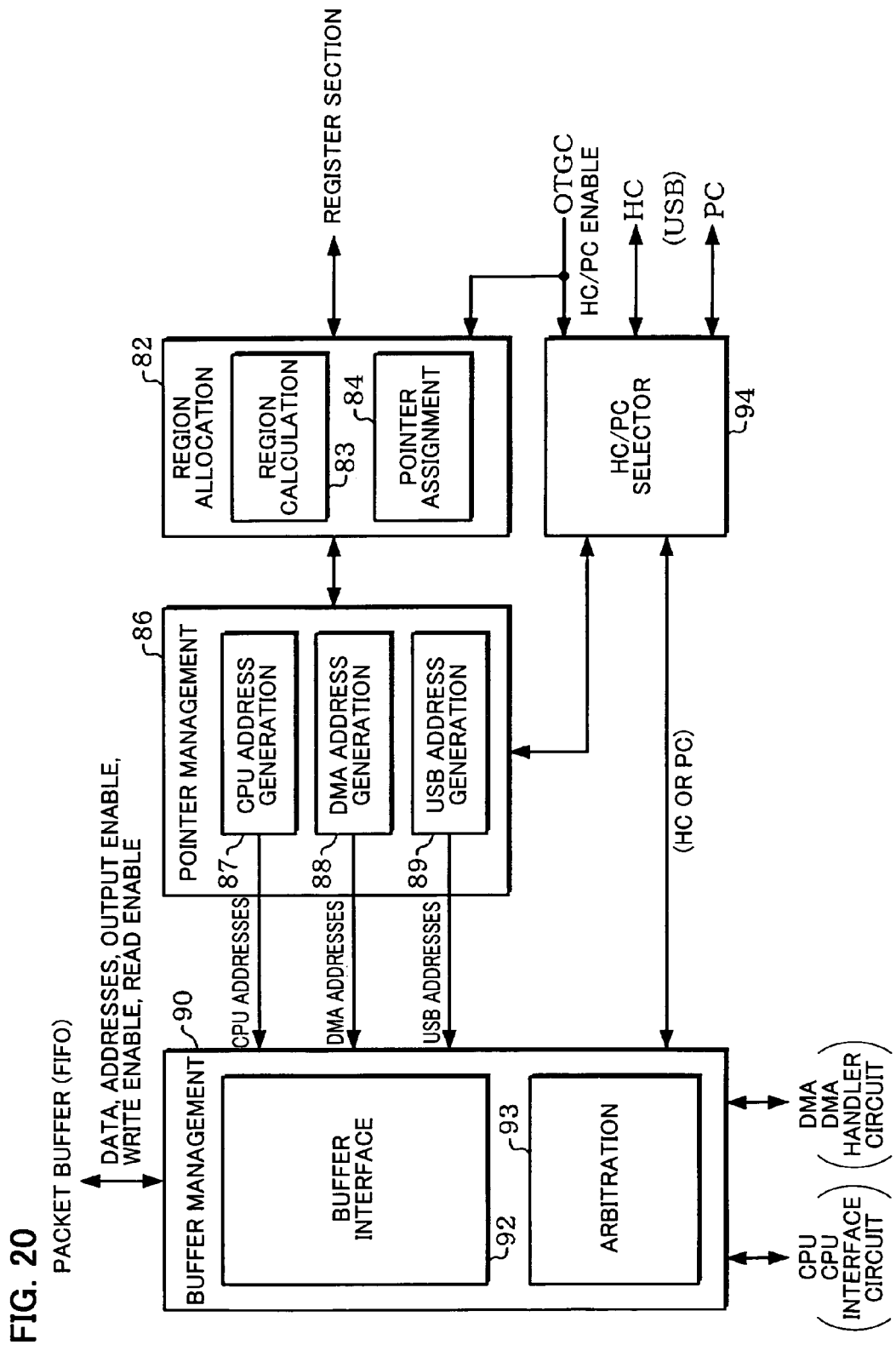
FIG. 20 shows a detailed example of the configuration of the buffer controller.

An example of the configuration of the buffer controller 80 is shown in FIG. 20.

The buffer controller 80 comprises a region allocation circuit 82. This region allocation circuit 82 is a circuit that allocates the buffer region in the packet buffer 100 (a region in which pipe regions are set during host operation or end point regions are set during peripheral operation).

The region allocation circuit 82 comprises a region calculation circuit 83. This region calculation circuit 83 is a circuit that calculates the region size, start address, and end address of the buffer region, based on the maximum packet size (generally speaking: the page size) and the number of pages.

Assume, by way of example, that a maximum packet size (MaxPktSize) of 32, 64, 64, and 64 bytes is set for each of the buffer regions PIPE0/EP0, PIPEa/EPa, PIPEb/EPb, and PIPEc/EPc shown in FIG. 21A and the number of pages (BufferPage) is set to 1, 1, 3, and 2 pages, respectively. The region calculation circuit 83 calculates the region sizes, start addresses, and end addresses of these buffer regions PIPE0/EP0 to PIPEc/EPc, based on data such as these maximum packet sizes and numbers of pages. In the example shown in FIG. 21A, the region sizes of PIPE0/EP0, PIPEa/EPa, PIPEb/EPb, and PIPEc/EPc are calculated to be 32 (=32×1), 64 (=64×1), 192 (=64×3), and 128 (=64×2) bytes, respectively.

A pointer assignment circuit 84 is a circuit that allocates write pointers WP (WP0, WPa, WPb, WPc) and read pointers RP (RP0, RPa, RPb, RPc) for each buffer region, to DMA pointers, CPU pointers, and USB pointers.

For data transmission (transfer of data from the DMA or CPU to the USB side through the packet buffer 100) when DMA transfer is used, as shown in FIG. 21B by way of example, the write pointer WP of that buffer region is allocated to be the pointer for DMA (DMA access) and the read pointer RP is allocated to be the pointer for USB (USB access). For data transmission when CPU (PIO) transfer is used, the write pointer WP of that buffer region is allocated to be the pointer for CPU (CPU access) and the read pointer RP is allocated to be the pointer for USB.

For data reception (transfer of data from USB to the DMA or CPU through the packet buffer 100) when DMA transfer is used, as shown in FIG. 21C, the write pointer WP of that buffer region is allocated to be the USB pointer and the read pointer RP is allocated to be the DMA pointer. Similarly, for data reception when CPU transfer is used, the write pointer WP of that buffer region is allocated to be the USB pointer and the read pointer RP is allocated to be the CPU pointer.

Note that the pointer information (position information) for the write pointer WP and read pointer RP of each buffer region is stored in each transfer condition register (PIPE/EP register) of the register section 70.

A pointer management circuit 86 is a circuit for creating actual addresses for access to the packet buffer 100, while updating the pointers.

The pointer management circuit 86 comprises a CPU address generation circuit 87, a DMA address generation circuit 88, and a USB address generation circuit 89. These address generation circuits 87, 88, and 89 generate CPU addresses, DMA addresses, and USB addresses, based on the CPU pointer, DMA pointer, and USB pointer allocated by the pointer assignment circuit 84. It also updates the pointers at each access from the CPU (CPU interface circuit) or DMA (DMA handler circuit) and at each transaction end (handshake transmission/reception such as ACK or NAK) Note that post-update pointer information is overwritten into the transfer condition registers of the register section 70 through the region allocation circuit 82.

A buffer management circuit 90 is a circuit that manages accesses to the packet buffer 100.

The buffer management circuit 90 comprises a buffer interface circuit 92. This buffer interface circuit 92 receives data such as CPU addresses, DMA addresses, and USB addresses from the pointer management circuit 86, performs input-output to the packet buffer 100, and outputs data such as addresses, output enable, write enable, and read enable.

The buffer management circuit 90 also comprises an arbitration circuit 93. This arbitration circuit 93 is a circuit that arbitrates accesses from the CPU (CPU interface circuit), DMA (DMA handler circuit), and USB (host controller or peripheral controller). A CPU address, DMA address, of USB address is output as an access address for the packet buffer 100, based on this arbitration result, to set a data transfer path between the CPU, DMA, or USB and the packet buffer 100.

An HC/PC selector 94 performs switching control of the connection between the buffer management circuit 90 (the buffer controller 80) and either the host controller 50 (HC) or the peripheral controller 60 (PC). During host operation, it connects the host controller 50 and the buffer management circuit 90, and during peripheral operation, it connects the peripheral controller 60 and the buffer management circuit 90. Note that this connection switching control is based on an HC/PC enable signal from the OTG controller 20.

10. Electronic Equipment

The description now turns to examples of electronic equipment comprising the data transfer control device of this embodiment of the invention.

Figure 22A:
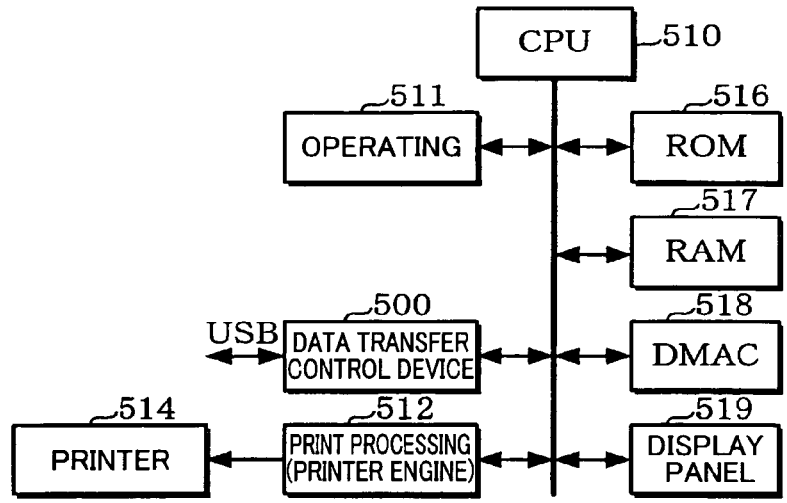
FIGS. 22A, 22B, and 22C are internal block diagrams of various items of electronic equipment.
Figure 23A:
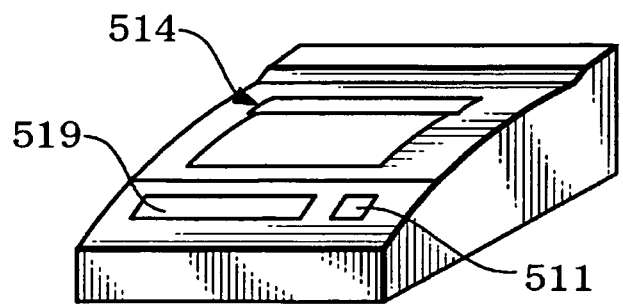
FIGS. 23A, 23B, and 23C are external views of various items of electronic equipment.

An internal block diagram of a printer that is one example of such electronic equipment is shown in FIG. 22A with an external view thereof being shown in FIG. 23A. A CPU 510 (processing section) has various functions, including that of controlling the entire system. An operating section 511 is designed to enable the user to operate the printer. Data such as a control program and fonts is stored in a ROM 516, and a RAM 517 (system memory) functions as a work area for the CPU 510. A DMAC 518 is a DMA controller for transferring data through the CPU 510. A display panel 519 is designed to inform the user of the operational state of the printer.

Serial print data that has been send in from another device such as a personal computer, digital camera, or digital video camera via USB is converted into parallel print data by a data transfer control device 500. The thus converted parallel print data is sent to a print processing section (a printer engine) 512 by the CPU 510 or the DMAC 518. This parallel print data is subjected to given processing in the print processing section 512 and is output for printing to paper by a print section (a device for outputting data) 514 comprising components such as a print head.

Figure 22B:
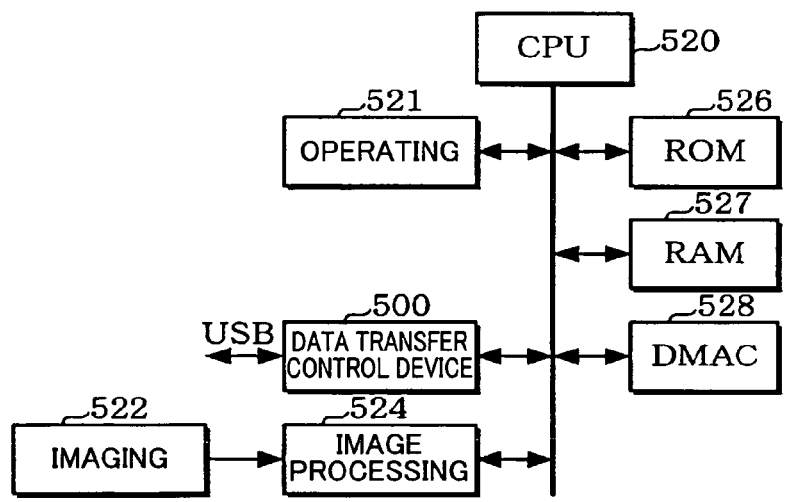
Figure 23B:
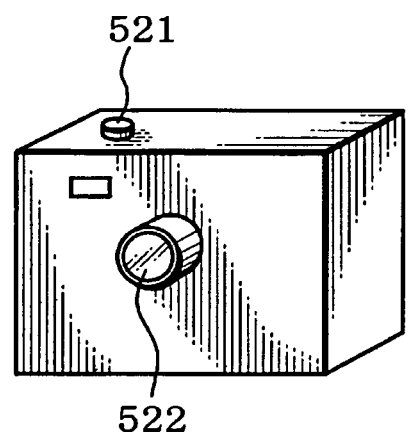

An internal block diagram of a digital camera that is another example of electronic equipment is shown in FIG. 22B with an external view thereof being shown in FIG. 23B. A CPU 520 has various functions, including that of controlling the entire system. An operating section 521 (comprising controls such as a shutter button and operating buttons) is designed to enable the user to operate the digital camera. Data such as a control program is stored in a ROM 526, and a RAM 527 functions as a work area for the CPU 520. A DMAC 528 is a DMA controller.

An image of a document is captured by an imaging section (a device for fetching data) 522, which comprises components such as a CCD and lens, and data of the captured image is processed by an image processing section 524. The processed image data is sent to the data transfer control device 500 by the CPU 520 or DMAC 528. The data transfer control device 500 converts that parallel image data into serial data and sends it to another device such as a printer, storage device, or personal computer via USB.

Figure 22C:
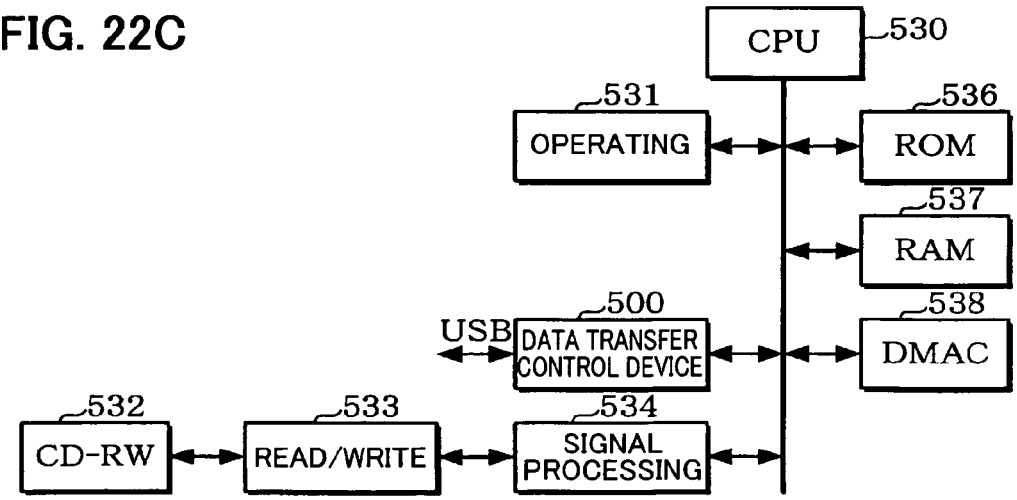
Figure 23C:
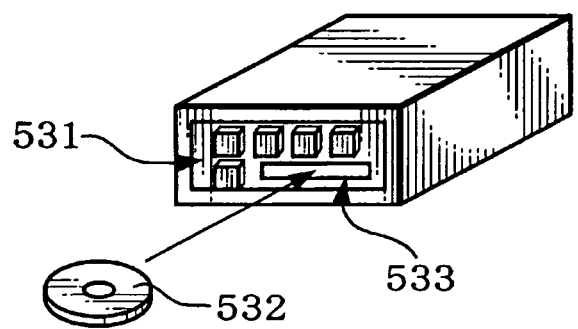

An internal block diagram of a CD-RW drive that is a further example of electronic equipment is shown in FIG. 22C with an external view thereof being shown in FIG. 23C. A CPU 530 has various functions, including that of controlling the entire system. An operating section 531 is designed to enable the user to operate the CD-RW drive. Data such as a control program is stored in a ROM 536, and a RAM 537 functions as a work area for the CPU 530. A DMAC 538 is a DMA controller.

Data read out from a CD-RW 532 by a read/write section (a device for fetching data or a device for storing data) 533, which comprises components such as a laser, a motor, and an optical system, is input to a signal processing section 534 where it is subjected to given signal processing such as error correction. The data that has been subjected to this signal processing is sent to the data transfer control device 500 by the CPU 530 or the DMAC 538. The data transfer control device 500 converts this parallel data into serial data, then sends it to another device via USB.

Serial data that comes in from another device via USB, on the other hand, is converted into parallel data by data transfer control device 500. This parallel data is sent to the signal processing section 534 by the CPU 530 or the DMAC 538. This parallel print data is subjected to given signal processing by the signal processing section 534 then is stored by the read/write section 533 on the CD-RW 532.

Note that a separate CPU for controlling data transfer by the data transfer control device 500 could be provided in addition to the CPU 510, 520, or 530 of FIGS. 22A, 22B, and 22C.

Use of the data transfer control device of this embodiment of the present invention in electronic equipment makes it possible to implement electronic equipment having the OTG function. In other words, electronic equipment can be made to have the role of host and also the role of a device, enabling the development of applications that have not existed up until now.

Use of the data transfer control device of this embodiment in electronic equipment makes it possible to reduce the processing load on the CPU (processing section) incorporated in electronic equipment, thus making it possible to use an inexpensive CPU. The CPU can also be made to have some spare time for processing other than data transfer control processing, enabling an increase in the capabilities of the electronic equipment and a reduction in the cost thereof. This also makes it possible to simplify firmware programs operating on the CPU, thus shortening the development period of electronic equipment.

Note that electronic equipment that can employ the data transfer control device in accordance with this embodiment includes other types of electronic equipment such as various types of optical disk drive (CD-ROM or DVD), magneto-optic disk drives (MO), hard disk drives, digital video cameras, mobile phones, scanners TVs, VCRs, audio equipment, telephones, projectors, personal computers, electronic note books, and dedicated wordprocessors.

Note also that the present invention is not limited to the embodiments described herein, and various modifications are possible within the scope of the invention laid out herein.

For example, the configuration of the data transfer control device in accordance with the present invention is preferably that as shown in FIG. 4, but it is not limited thereto.

The configurations of the various blocks of the data transfer control device (such as the HC, PC, and OTGC blocks) are also not limited to those described with reference to this embodiment, and thus various modifications are possible.

The circuits for the automatic transfer of short packets and zero-length packets are similarly not limited to those shown in FIGS. 10 and 13 and thus various modifications are possible.

Terminology (such as: OTG controller, CPU/firmware, host controller or peripheral controller, USB, pipe region or end point region) that is derived from generic terminology defined within this document (such as: state controller, processing section, transfer controller, bus, or buffer region) could be replaced by other terminology used within this document.

Some of the requirements of the dependent claims of the present invention may be omitted. Some of requirements of any one of the independent claims of the present invention can be made to depend on any other independent claims of the present invention.

This embodiment has been described with reference to the application thereof to the USB OTG standard, but the applications of the present invention are not limited to the OTG standard. In other words, the present invention can be applied to data transfer not only of the USB OTG standard, but also to the prior-art USB 1.1 and USB 2.0, as well as standards developed therefrom.

What is claimed is:

1. A data transfer control device for data transfer over a bus, the data transfer control device comprising:
   a buffer controller which controls access to a packet buffer in which is stored transfer data;
   a register section including registers in which are set the total size of transfer data and the maximum packet size;
   a transfer controller which automatically issues a first transaction with respect to an end point, and automatically transfers data to the end point while calculating the remaining size of data to be transferred, based on the total size of data and the maximum packet size,
   wherein the transfer controller automatically issues a subsequent transaction and automatically transfers a short packet to the end point, when the remaining data size of transfer data in the first transaction is less than a maximum packet size;
   a plurality of pipe regions for storing data to be transferred to or from the end points are allocated in the packet buffer;

the register section includes a plurality of transfer condition registers in each of which transfer condition information for data transfer between each of the pipe regions and corresponding one of the end points is set;

the total size and the maximum packet size are set in the transfer condition registers as the transfer condition information;

the transfer controller automatically issues a transaction with respect to one of the end points, based on the transfer condition information in the transfer condition registers, and automatically transfers data between each of the pipe regions and corresponding one of the endpoints;

wherein:

the transfer controller automatically issues the next transaction and automatically transfers a short packet of zero data length to the end point, when the payload size of a packet to be transferred by the current transaction is the maximum packet size, and also the remaining data size of the transfer data is zero;

an automatic transfer instruction for turning on or off the automatic transfer of the short packet of zero data length is set in each of the transfer condition registers for each of the pipe regions; and the transfer controller automatically transfers the short packet of zero data length when the automatic transfer instruction set in each of the transfer condition registers is valid.

2. The data transfer control device as defined in claim 1, wherein:

the transfer controller performs processing to determine whether or not to transfer a short packet, based on the remaining data size of transfer data in each of the pipe regions.

3. The data transfer control device as defined in claim 1, further comprising:

a state controller which controls a plurality of states including a host-operation state, in which the data transfer control device operates as a role of a host, and a peripheral-operation state, in which the data transfer control device operates as a role of a peripheral, wherein:

the transfer controller includes a host controller which performs data transfer as a host during host operation, and a peripheral controller which performs data transfer as a peripheral during peripheral operation;

during host operation, a plurality of pipe regions for storing data to be transferred to or from the end points are allocated in the packet buffer, and the host controller transfers data between each of the pipe regions and corresponding one of the end points;

during peripheral operation, a plurality of end point regions for storing data to be transferred to or from a host are allocated in the packet buffer, and the peripheral controller transfers data between each of the end point regions and the host; and the host controller automatically transfers a short packet to one of the end points corresponding to each of the pipe regions, during host operation.

4. The data transfer control device as defined in claim 1, further comprising:

an interface circuit which performs data transfer between another bus that differs from the bus and the packet buffer, wherein:

when a processing section has instructed the interface circuit and the transfer controller to start data transfer, the interface circuit performs data transfer through the other bus and also the transfer controller performs data transfer through the bus; and when the data transfer has ended, the transfer controller generates an interrupt with respect to the processing section.

5. The data transfer control device as defined in claim 1, wherein data transfer conforming to the universal serial bus (USB) on-the-go (OTG) standard is performed.

6. Electronic equipment comprising:

the data transfer control device as defined in claim 1;

a device which performs output processing, fetch processing, or storage processing on data to be transferred through the data transfer control device and the bus; and a processing section which controls data transfer of the data transfer control device.

7. A data transfer control method for data transfer through a bus, the method comprising:

performing access control for a packet buffer in which transfer data is stored;

setting the total size of transfer data and the maximum packet size in registers in a register section;

automatically issuing a first transaction with respect to an end point and automatically transferring data to the end point while calculating the remaining size of data to be transferred, based on the total size of data and the maximum packet size;

automatically issuing a subsequent transaction and automatically transferring a short packet to the end point, when the remaining size of transfer data in the first transaction is less than a maximum packet size;

allocating a plurality of pipe regions for storing data to be transferred to or from the end points, in the packet buffer;

setting the total size and the maximum packet size in the transfer condition registers as the transfer condition information for data transfer between each of the pipe regions and corresponding one of the end points, the register section including a plurality of transfer condition registers in each of which the transfer condition information is set;

automatically issuing a transaction with respect to each of the end points, based on the transfer condition information in each of the transfer condition registers, and automatically transferring data between each of the pipe regions and corresponding one of the endpoints;

automatically issuing the next transaction and automatically transferring a short packet of zero data length to the end point, when the payload size of the packet to be transferred by the current transaction is the maximum packet size, and also the remaining data size of the transfer data is zero;

setting an automatic transfer instruction for turning on or off the automatic transfer of the short packet of zero data length in each of the transfer condition registers for each of the pipe regions; and automatically transferring the short packet of zero data length when the automatic short transfer instructions set in each of the transfer condition registers is valid.

8. The data transfer control method as defined in claim 7, further comprising:

allocating a plurality of pipe regions for storing data to be transferred to or from the end points, in the packet buffer;

setting the total size and the maximum packet size in the transfer condition registers as the transfer condition information for data transfer between each of the pipe regions and corresponding one of the end points, the register section including a plurality of transfer condition registers in each of which the transfer condition information is set; and automatically issuing a transaction with respect to each of the end points, based on the transfer condition information in each of the transfer condition registers, and automatically transferring data between each of the pipe regions and corresponding one of the end points.

9. The data transfer control method as defined in claim 7, further comprising:

controlling a plurality of states including a host-operation state, in which a data transfer control device operates as a role of a host, and a peripheral-operation state, in which the data transfer control device operates as a role of a peripheral;

allocating a plurality of pipe regions for storing data to be transferred to or from end points in the packet buffer, and transferring data between each of the pipe regions and corresponding one of the end points, during host operation; and allocating a plurality of end point regions for storing data to be transferred to or from the host in the packet buffer, and transferring data between each of the end point regions and the host, during peripheral operation; and automatically transferring a short packet of zero data length to the host, during peripheral operation.

10. The data transfer control device of claim 1, wherein the transfer condition register includes a common register used both during host operation and during peripheral operation; and the total size, the maximum packet size, and the automatic transfer instruction of the short packet having zero data length are set in the common register of the transfer condition register.

11. The data transfer control method of claim 7, further comprising:

using the transfer condition register, which includes a common register, both during host operation and during peripheral operation; and setting in the common register of the transfer condition register the total size, the maximum packet size, and the automatic transfer instruction of the short packet having zero data length.

* * * * *